US012793046B2

(12) United States Patent
Jaladanki et al.

(10) Patent No.: US 12,793,046 B2
(45) Date of Patent: Nov. 10, 2026

(54) COMPUTER FRAMEWORK FOR DIGITAL WALLET INTEROPERATBILITY

(71) Applicant: PAYPAL, INC., San Jose, CA (US)

(72) Inventors: Sreenivasulu Jaladanki, San Ramon, CA (US); Mudita Tiwari, Cupertino, CA (US); Samuel John Parsons, Ames, IA (US); Sathyanarayanan Sampath, Dublin, CA (US); Cory Monty, San Deigo, CA (US); Rohit Basu, San Jose, CA (US); Vyomesh Sharma, Milpitas, CA (US); Todd Daniel Meijome, Chandler, AZ (US); Thomas Raymond Warne, Phoenix, AZ (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 19/274,176

(22) Filed: Jul. 18, 2025

(65) Prior Publication Data

US 2026/0245074 A1 Aug. 20, 2026

Related U.S. Application Data

(60) Provisional application No. 63/761,100, filed on Feb. 20, 2025.

(51) Int. Cl.
*G06Q 20/36* (2012.01)
*G06Q 20/32* (2012.01)

(52) U.S. Cl.
CPC ....... *G06Q 20/3674* (2013.01); *G06Q 20/326* (2020.05)

(58) Field of Classification Search
CPC ......................... G06Q 20/3674; G06Q 20/326
USPC ........................................................... 705/67
See application file for complete search history.

(56) References Cited

U.S. PATENT DOCUMENTS

| | | | | |
|---|---|---|---|---|
| 2014/0156532 | A1 | 6/2014 | Balasubramanian et al. | |
| 2022/0012698 | A1 | 1/2022 | Kohli | |
| 2022/0188803 | A1* | 6/2022 | Nazir | G06Q 20/3274 |
| 2023/0186300 | A1 | 6/2023 | Collins et al. | |
| 2023/0306411 | A1* | 9/2023 | Dao | G06Q 20/36 |
| 2024/0202675 | A1* | 6/2024 | Mueller | G06Q 20/3265 |
| 2024/0370852 | A1* | 11/2024 | Slowiak | G06Q 20/385 |
| 2025/0371529 | A1* | 12/2025 | Stockley | G06Q 20/382 |

OTHER PUBLICATIONS

International Search Report and Written Opinion for Application No. PCT/US2026/015342, mailed on Apr. 14, 2026, 10 pages.

* cited by examiner

*Primary Examiner* — Courtney P Jones
(74) *Attorney, Agent, or Firm* — Haynes and Boone, LLP

(57) ABSTRACT

Methods and systems are presented for providing a computer framework for processing transactions among digital wallets that are associated with different transaction processors. The computer framework includes a universal transaction platform that provides various functionalities to different transaction processing systems and/or digital wallet applications via one or more application programming interfaces. The functionalities provided by the universal transaction platform enables the different transaction processing systems and/or the digital wallet applications to perform the necessary tasks in the processing of transactions between digital wallets that are associated with different transaction processing systems.

20 Claims, 16 Drawing Sheets

COMPUTER FRAMEWORK FOR DIGITAL WALLET INTEROPERATBILITY

CROSS REFERENCE TO RELATED APPLICATION

The present application claims priority to U.S. Provisional Patent Application Ser. No. 63/761,100, filed Feb. 20, 2025, which is incorporated herein by reference in its entirety.

TECHNICAL FIELD

The present specification generally relates to computer frameworks, and more specifically, to providing a computer framework for facilitating transactions between digital wallets that are registered with different transaction processors according to various embodiments of the disclosure.

BACKGROUND

Digital wallets are part of a computer system that facilitates transactions among different entities. Example computer systems include PayPal One Touch®, Apple Pay®, Samsung Pay®, Venmo, Google Pay®, Cash App®, Alipay®, WeChat Pay®, Unified Payment Interface (UPI)®, etc. Users of any one of these computer systems may store payment source data of one or more payment sources (e.g., credit cards, debit cards, gift cards, bank accounts, etc.) in their respective digital wallets. For example, a user may store information associated with a payment card (e.g., an account number, an expiration date, a security code, etc.) in a digital wallet, and may then use a digital wallet application of a user device (e.g., a mobile device, etc.) associated with the digital wallet to initiate payment transactions with other users of the computer system.

Each of the computer systems may be associated with (or include) a payment processor for processing transactions for the respective users. Since different computer systems may use different techniques and/or interfaces to communicate with the digital wallet applications and to process payment transactions, each computer system can typically only process transactions between digital wallets associated with that computer system (e.g., digital wallets that were registered with the same computer system), and not with digital wallets associated with another computer system. The lack of interoperability among digital wallets associated with different computer systems (e.g., different transaction processors) may lead to computer resource inefficiencies in facilitating electronic transactions (e.g., each user may have to acquire multiple digital wallets registered with multiple transaction processors, etc.), or the inability to process some of the electronic transactions. Thus, there is a need for providing a computer framework that provides interoperability among digital wallets registered with different transaction processors.

Figure 1:
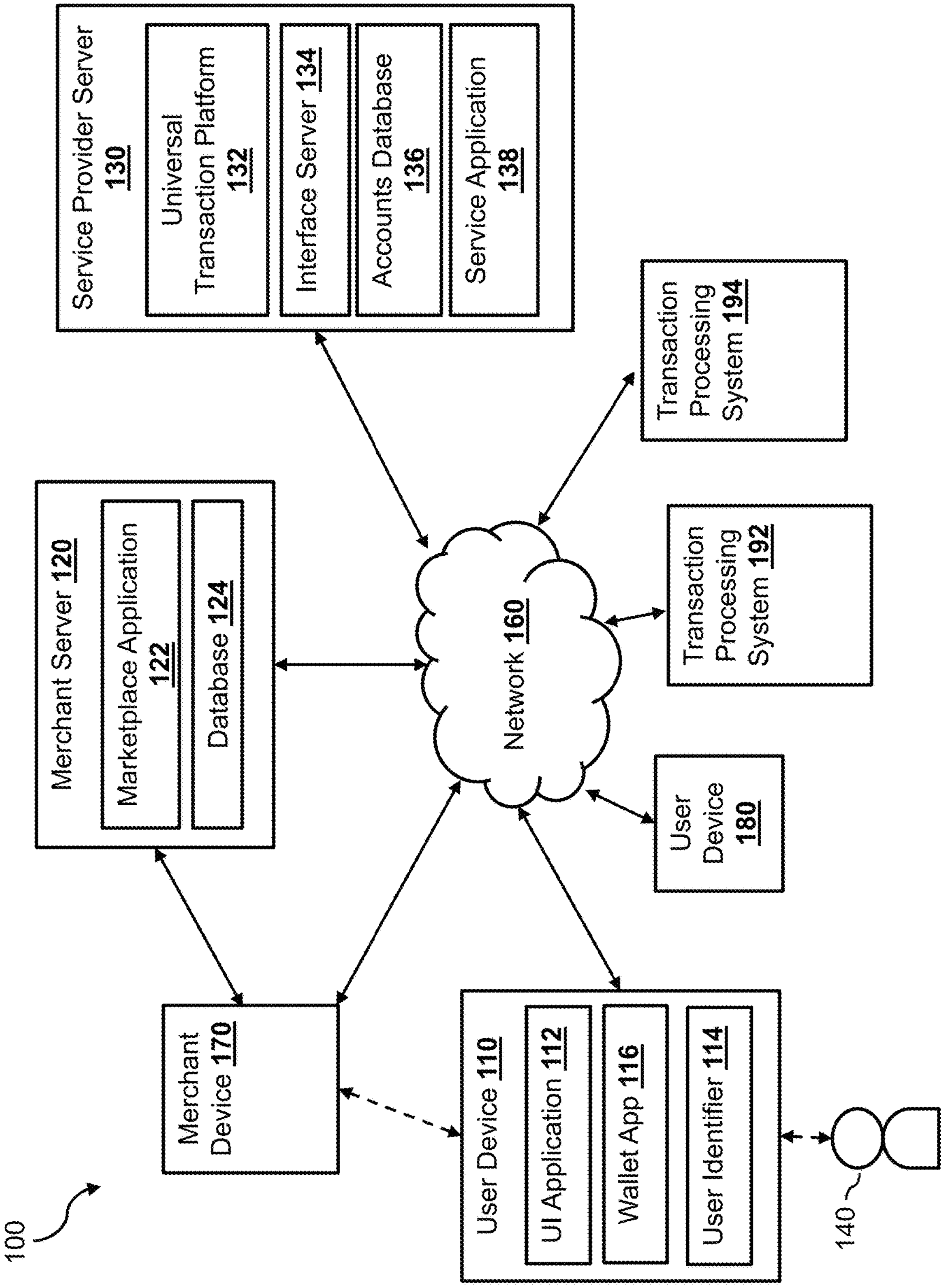
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a computer framework for processing transactions among digital wallets that are associated with different transaction processors (e.g., different transaction processing systems, etc.). As discussed herein, transaction processors may facilitate transactions among various digital wallets. For example, when a user registers with a transaction processor, the transaction processor may generate, for the user's registration request, a digital wallet (e.g., a digital object, etc.) that can be used to store data associated with one or more payment sources or funding instruments (e.g., one or more credit cards, one or more debit cards, one or more gift cards, one or more bank accounts, etc.) of the user. The transaction processor may also provide a digital wallet application that can be installed and executed on one or more devices of the user (e.g., a mobile device, a laptop, etc.). The digital wallet application may be linked to the digital wallet application, such that the digital wallet application may store and/or access information of the user (e.g., the payment source data of the one or more payment sources, etc.). The user may then initiate transactions with other users of the transaction processor (e.g., a merchant, a human user, etc.) through the digital wallet using the digital wallet application.

To process a transaction, the digital wallet application may communicate with a transaction processing system of the associated transaction processor. The digital wallet application and the transaction processing system may be configured to communicate with each other using a particular communication protocol (e.g., a particular communication handshake technique, a particular authentication protocol for authenticating the digital wallet application and/or the transaction processing system, etc.). The digital wallet application may transmit transaction data of the transaction to the transaction processing system using the particular communication protocol. If the transaction is associated with sending funds from the user to another entity, the transaction data may include payment source data that is stored in the digital wallet of the user. The payment source data may represent a particular payment source (e.g., a credit card, a debit card, a gift card, a bank account, etc.) of the user (e.g., the sender). The transaction data may also include digital wallet information of a digital wallet of the recipient (e.g., an identifier of the digital wallet of the recipient, etc.) in the transaction and other details associated with the transaction (e.g., an amount, description of one or more items if the transaction is a purchase transaction, etc.).

If the transaction is associated with receiving funds from another digital wallet to the digital wallet of the user, the transaction data may include digital wallet information of the digital wallet of the user (e.g., an identifier of the digital wallet, etc.), digital wallet information of the sender (e.g., an identifier, such as a phone number, an e-mail address, etc. corresponding to the digital wallet, etc.), and other details of the transaction (e.g., an amount, description of one or more items if the transaction is a purchase transaction, etc.). The transaction processing system may then communicate with another digital wallet application (e.g., the digital wallet application of the sender, etc.) to obtain payment source data associated with a payment source of the sender usable in the transaction.

The transaction processing system may process the transaction using the transaction data. For example, the transaction processing system may use one or more computer programs (e.g., computer models such as machine learning models, etc.) to authenticate and verify the digital wallet of the sender and the digital wallet of the recipient in the transaction. When both of the digital wallets involved in the transaction are part of the transaction processing system (e.g., registered with the transaction processing system, etc.), the transaction processing system has the information (e.g., profile information of the user associated with the digital wallet, a transaction history of the digital wallet, transaction patterns associated with the digital wallet, etc.) required by the computer programs to authenticate and verify the digital wallets, and subsequently process the transaction by transferring funds and/or tokens from the payment source of the sender to the digital wallet of the recipient.

As such, the transaction processing system may facilitate the processing of transactions between digital wallets when the digital wallets of all of the participants in the transactions are associated with the transaction processing system (e.g., registered or onboarded with the transaction processing system, etc.). However, when at least one of the digital wallets involved in a transaction is not associated with the transaction processing system, the transaction processing system may not be able to process the transaction on its own. It is because the transaction processing system may not have access to needed information associated with that digital wallet, and cannot transfer funds to and from that digital wallet as a result. The transaction processing system may also be unable to communicate with at least one of the digital wallet applications that is not associated with the transaction processing system for obtaining information of the digital wallet due to the different communication protocols used by the digital wallet application and the transaction processing systems being incompatible with each other. As used herein, "incompatible" refers to transaction processing systems that do have information about two or more digital wallets involved in a transaction, where the information is needed to process the transaction. Examples of such information include funding source information, including bank account information and credit/debit card information, account identifiers Without specific information associated with the digital wallet, the transaction processing system may not be able to perform the required authentication, verification, and fund transferring process for the digital wallet that is not associated with the transaction processing system, which results in the user being unable to complete the transaction and needing to find an alternative to completing the transaction. This situation can be increasingly present as more and more transaction processing systems become available and increasingly higher numbers of transactions are conducted across different countries.

To address the problems with conventional computing systems, according to various embodiments of the disclosure, a computer framework is provided that enables facilitating transactions between digital wallets that are associated with different transaction processing systems. The computer framework includes a universal transaction platform that provides various functionalities to different transaction processing systems and/or digital wallet applications via one or more application programming interfaces (APIs). The functionalities provided by the universal transaction platform enable the different transaction processing systems and/or the digital wallet applications to perform the necessary tasks in the processing of transactions between digital wallets that are associated with different transaction processing systems.

Note that the term "transaction processing system" or "payment system" as used herein includes one or more computing devices (e.g. servers) that are configured to facilitate electronic transactions, according to various embodiments. Such electronic transactions may include a digital transfer of monetary currency from one party to another, and may also include other types of digital transfers (e.g. cryptocurrency, non-fungible token) as well. A payment system may receive a request from a first user to complete an electronic transaction involving a second user, and approve or reject such a request. Transaction processing systems may also facilitate currency conversion in some instances (e.g. a first user sends U.S. dollars to a second user who receives those funds in Mexican Pesos).

In some embodiments, the universal transaction platform may provide a discovery functionality via one or more discovery APIs. The discovery functionality enables a transaction processing system and/or a digital wallet application associated with the transaction processing system to discover information associated with a digital wallet that is not associated the transaction processing system. In one example, a first user of a first transaction processing system initiates a transaction via an application executed on a device. The first user of the first transaction processing system may be a merchant who has a digital wallet that is registered with the first transaction processing system. The application may be associated with the first transaction processing system, and may be used to facilitate the processing of transactions conducted with the first user. The application may be a web application that is incorporated into a website associated with the first user, a point-of-sale application executed on a point-of-sale device at a checkout location of the first user, or a digital wallet application that is linked to the digital wallet of the first user.

The application may communicate with the first transaction processing system, for example, to initiate a transaction conducted with the first user. In some embodiments, the application provides a user interface for interacting with other users (e.g., consumers of the merchant) during the processing of transactions with the first user. For example, during a checkout process for purchasing one or more items from the first user, the application may prompt a second user (e.g., a consumer of the merchant) for payment information for the purchase transaction. The application may then obtain the payment information based on inputs provided by the second user via the user interface or based on communications (e.g., a peer-to-peer communication such as a near-field communication, etc.) between the application executed on the device of the first user and a device of the second user (e.g., a mobile device of the second user, etc.). The payment information may include identifying information associated with a digital wallet of the second user (e.g., a phone number of a device associated with the second user, an email address associated with the second user, etc.).

The application may initiate a transaction with the first transaction processing system. For example, the application may provide, to the first transaction processing system, an identifier associated with the digital wallet of the first user (e.g., the merchant, etc.), the identifying information associated with the digital wallet of the second user (e.g., the phone number, the email address, etc.), and details of the transaction such as an amount, descriptions of the items being purchased, etc.

Based on the identifying information provided by the application, the first transaction processing system may not be able to (e.g., may fail to, etc.) identify a digital wallet for the second user if the digital wallet of the second user is not associated with the first transaction processing system (e.g., is registered with a second transaction processing system that is not accessible by or able to communicate with the first transaction processing system, etc.). Without the functionalities provided by the universal transaction platform, the first transaction processing system may not be able to process the transaction due to the lack of informational resources associated with the digital wallet of the second user, and the lack of interoperability with other transaction processing systems. As a result, the first transaction processing system may have to deny the purchase transaction.

However, using the computer framework disclosed herein, when the first transaction processing system fails to identify a digital wallet for the second user in the transaction (since the digital wallet of the second user is not registered with or otherwise accessible by the first transaction processing system), the first transaction processing system may obtain digital wallet information of the second user in the transaction from the universal transaction platform. For example, the first transaction processing system may transmit a discovery request to the universal transaction platform (e.g., via the discovery API provided by the universal transaction platform, etc.). In some embodiments, the first transaction processing system may provide the identifying information associated with the digital wallet of the second user as a parameter in the discovery API call transmitted to the universal transaction platform. In response to the discovery API call, the universal transaction platform may provide to the first transaction processing system digital wallet information associated with the digital wallet based on the identifying information. The digital wallet information may specify an identity of the second transaction processing system with which the digital wallet of the second user is registered, and other information, such as a name of the second user, etc.

The universal transaction platform may use different techniques to access digital wallet information of digital wallets that are registered with different transaction processing systems. In some embodiments, the universal transaction platform may retrieve data objects representing different digital wallets from the different transaction processing systems (e.g., from the servers or databases associated with the different transaction processing systems, etc.). Each of the data objects may represent a corresponding digital wallet that is registered with one of the transaction processing systems. Each of the data objects may include an identifier that enables an identification of a user of the digital wallet (e.g., a phone number, an email address, etc.) and digital wallet information associated with the digital wallet. The digital wallet information may include an identifier of the digital wallet within the second transaction processing system, additional information associated with the user (e.g., a name, an address, etc.), a country in which the digital wallet is registered, a currency used in the digital wallet, a status of the digital wallet that indicates whether the digital wallet is in good standing or not, and other information.

The universal transaction platform may generate a data record for each of the retrieved data objects. In some embodiments, the universal transaction platform may encrypt at least some of the digital wallet information, and may store the identifier and the encrypted digital wallet information in the record. The record may be implemented as a key-value pair, with the identifier stored as a key of the record and the encrypted digital wallet information stored as the value of the record. In some embodiments, the universal transaction platform may also generate a hash value for the identifier (e.g., by applying one or more hash algorithms to the identifier, etc.), and may use the hash value instead of the identifier as the key of the record to further enhance the data security of the data record. The universal transaction platform may store the data records in one or more databases, using the keys of the records as the primary keys of the database systems.

When the universal transaction platform receives a discovery request via the discovery API, the universal transaction platform may query the one or more database systems using the identifying information provided by the transaction processing system. The universal transaction platform may identify a data record, among the data records stored in the one or more database systems, for the discovery request based on the primary key of the record (e.g., the identifier, a hash value of the identifier, etc.) matching the identifying information (or a hash value generated based on the identifying information). The universal platform may then access the digital wallet information stored in the data record and provide at least a portion of the digital wallet information to the transaction processing system as a response to the discovery API call.

If the universal transaction platform determines that no data records stored in the one or more database systems match the identifying information, the universal transaction platform may transmit a query request to the different servers associated with the different transaction processing systems. When a transaction processing system determines a match between the identifying information and a digital wallet registered with the transaction processing system, the corresponding server may generate a data object based on the digital wallet information of the digital wallet, and transmit the data object to the universal transaction platform as a response to the query request. The universal transaction platform may then generate a data record for the data object, and store the data record in the one or more database systems. The universal transaction platform may also transmit the data object (or a portion of the data object) to the requesting transaction processing system as a response to the discovery API call.

In some embodiments, the universal transaction platform may distribute the data records in the one or more database systems according to one or more factors. For example, the universal transaction platform may distribute the data records in the one or more database systems according to geographical regions with which the corresponding transaction processing systems are associated. As such, the universal transaction platform may store a first subset of the data records representing digital wallets that are registered with a first subset of the transaction processing systems associated with a first geographical region (e.g., North America, South America, etc.), store a second subset of the data records representing digital wallets that are registered with a second subset of the transaction processing systems associated with a second geographical region (e.g., Asia, etc.), store a third subset of the data records representing digital wallets that are registered with a third subset of the transaction processing systems associated with a third geographical region (e.g., Europe, etc.), and so forth. By arranging the data records representing the different digital wallets in this manner, the universal transaction platform may enhance the computer efficiency in processing discovery requests by selectively querying one (or a subset) of the database systems based on the identifying information. For example, when the identifying information is a phone number, the universal transaction platform may identify a region associated with the phone number (e.g., based on a country code, etc.), and may select a database system that stores data record associated with the region for querying (and not the other database systems), which reduces the need (and the computer resources) for querying all of the database systems to process each discovery request.

In some embodiments, each of the transaction processing system may have a data retention policy associated with the data objects provided to the universal transaction platform. The data retention policy specifies a period of time within which the universal transaction platform may store information associated with the data objects. As such, the universal transaction platform may continuously monitor the status of each data record stored in the one or more database systems, and may determine an expiration time for each data record based on the data retention policy of the associated transaction processing system. When the universal transaction platform determines that a data record has expired, the universal transaction platform may discard (e.g., delete, remove, etc.) the data record from the one or more database systems. The data retention policy (e.g., a length of time in which the universal transaction platform is allowed to store the data objects, etc.) of a transaction processing system may be determined based in part on the particular geographical region associated with the transaction processing system, such that the data retention policy transaction processing systems associated with the same region may have similar (e.g., within a length of time threshold, etc.) or the same data retention policy. As such, the separation of data records in different database systems according to the regions may enable the universal transaction platform to improve the efficiency in monitoring and enforcing the data retention policies of the different transaction processing systems. For example, the universal transaction platform may deploy different computer programs for monitoring and enforcing the data retention policies to the different database systems, where each computer program may only need to monitor and enforce a single data retention policy. The computer program may simply remove/discard data records from a database system associated with the same data retention policy (e.g., since they are associated with the same region) at the same time.

In some embodiments, the universal transaction platform may receive updates from the servers associated with the different transaction processing systems, and may update the data records based on the updates. The updates may cause the universal transaction platform to modify one or more records in the one or more database systems. The updates may specify changes to one or more of the digital wallets, such as a change of the status (e.g., the digital wallet is suspended or locked, etc.), a change of the corresponding user's information, a change of currency information, etc.

In some embodiments, the universal transaction platform may provide other functionalities in addition to the discovery functionalities. For example, the universal transaction platform may provide transaction processing functionalities via one or more APIs (e.g., a push API, a pull API, etc.). Thus, a transaction processing system may transmit a push API or a pull API call to the universal transaction platform to initiate a processing of a payment transaction between two digital wallets that are registered with different transaction processing systems. The choice of making a push API call or a pull API call depends on whether the initiating transaction processing system is associated with a digital wallet involved in the transaction that receives funds from another digital wallet or transmits funds to another digital wallet. In some embodiments, the transaction processing system provides, as the parameters of the push API call or the pull API call, information associated with the two digital wallets (e.g., account numbers associated with the digital wallets, identifiers of the transaction processing systems associated with the digital wallets, transaction details of the transaction such as a transaction amount, etc.).

When the universal transaction platform receives a transaction processing request (e.g., via a push API call or a pull API call from the first transaction processing system, etc.), the universal transaction platform may process the transaction based on the information included in the API call. For example, the universal transaction platform may determine the transaction processing systems associated with the digital wallets involved in the transaction (e.g., the first transaction processing system associated with the digital wallet of the first user, the second transaction processing system associated with the digital wallet of the second user, etc.), and may communicate with the transaction processing systems to process the transaction.

In some embodiments, the universal transaction platform may communicate with the second transaction processing system to process the transaction. For example, the universal transaction platform may transmit a transaction request to the second transaction processing system based on the digital wallet information of the digital wallet of the second user. The transaction request may cause the second transaction processing system to authenticate and verify the digital wallet of the second user. For example, the second transaction processing system may prompt the second user for a confirmation of the transaction. If the second user is a sender in the transaction, the second transaction processing system may verify that the digital wallet of the second user has sufficient funds (e.g., has at least the amount associated with the transaction, etc.). In some embodiments, the transaction request may cause the second transaction processing system to communicate with a user device of the second user in order to authenticate the second user for processing the transaction.

The second transaction processing system may include one or more computer programs (e.g., computer models such as machine learning models, etc.) configured to authenticate and verify digital wallets that are involved in a transaction when processing the transaction. The one or more computer programs may be configured to analyze information associated with a digital wallet (e.g., profile information of the user associated with the digital wallet, a transaction history of the digital wallet, transaction patterns associated with the digital wallet, etc.) and authenticate/verify the digital wallet based on analyzing the information. In some embodiments, the one or more computer programs may determine a likelihood that the transaction is a fraudulent transaction based on various factors such as transaction information associated with the transaction to be processed, a transaction history of the digital wallet of the user, profile information associated with the user, etc. Based on the information obtained by the second transaction processing system (e.g., from the universal transaction platform and from the second user via the communication with the user device, etc.), the second transaction processing system may use the one or more computer programs to authenticate and/or verify the digital wallet of the second user for the transaction. For example, the one or more computer programs may generate an output that indicates a likelihood that the transaction is legitimate based on the information associated with the digital wallet of the second user.

Since different transaction processing systems may use different techniques and/or algorithms to analyze the digital wallets involved in a transaction, the one or more computer programs used by the second transaction processing system may include logics and parameters for analyzing digital wallets that are specific to the second transaction processing system (e.g., different from the logics and parameters used by other transaction processing systems, etc.). In order for the second transaction processing system to process (e.g., to authorize and/or effect a transfer of funds for) the transaction between the first user and the second user, the second transaction processing system may need to also analyze the digital wallet of the first user using the one or more computer programs. However, since the digital wallet of the first user was registered with a different transaction processing system, the second transaction processing system does not have access to the information required to analyze the digital wallet of the first user, the second transaction processing system may lack the information required to analyze the digital wallet of the first user.

As such, in some embodiments, the second transaction processing system transmits the one or more computer programs (or the logic associated with the one or more programs, such as pseudocode, a decision tree, etc.) to the universal transaction platform. The universal transaction platform may re-generate the one or more programs based on the logic, and execute the one or more computer programs using the information of the digital wallet of the first user that is stored within the universal transaction platform or accessible by the universal transaction platform. Alternatively, the universal transaction platform may transmit the one or more computer programs (or the logic) to the first transaction processing system, and request the first transaction processing system to execute the one or more computer programs using the information of the digital wallet of the first user stored within the first transaction processing system. Based on analyzing the information of the digital wallet of the first user, the one or more computer programs may generate one or more outputs, which may indicate whether the digital wallet of the first user is authenticated/verified. The universal transaction platform may transmit the one or more outputs to the second transaction processing system.

Similarly, the first transaction processing system may transmit, to the universal transaction platform, one or more computer programs that are used by the first transaction processing system to authenticate and/or verify digital wallets involved in a transaction. The universal transaction platform may execute the one or more computer programs using the information associated with the digital wallet of the second user stored within the universal transaction platform. Alternatively, the universal transaction platform may transmit the one or more computer programs (or the logic) to the second transaction processing system, and request the second transaction processing system to execute the one or more computer programs using the information of the digital wallet of the second user stored within the second transaction processing system. Based on analyzing the information of the digital wallet of the first user, the one or more computer programs may generate one or more outputs, which may indicate whether the digital wallet of the second user is authenticated/verified. The universal transaction platform may transmit the one or more outputs to the first transaction processing system.

Based on the results from analyzing the digital wallets, the first transaction processing system and the second transaction processing system may determine whether the transaction is authorized, and may provide the authorization signals to the universal transaction platform. The universal transaction platform may then process the transaction based on the authorization signals. For example, the universal transaction platform may instruct the transaction processing system (e.g., the second transaction processing system) associated with a sender of the transaction to deduct funds from the digital wallet of the sender (e.g., the second user) and instruct the transaction processing system (e.g., the first transaction processing system) associated with a recipient of the transaction to credit funds to the digital wallet of the recipient (e.g., the first user). The universal transaction platform may also transfer funds (e.g., tokens in a blockchain, etc.) between the first transaction processing system and the second transaction processing system within a ledger (e.g., within a blockchain, etc.).

Using the framework as disclosed herein, the universal transaction platform may facilitate the processing of transactions between digital wallets that are associated with different transaction processing systems under different scenarios. For example, the transactions may be conducted online between merchants and consumers via the user interfaces (e.g., a website, a mobile application, etc.) provided by the merchants. In another example, the transactions may be conducted at point-of-sale locations (e.g., at a cashier checkout, etc.) of the merchants. A consumer may either use a digital wallet application of the user device of the user to unilaterally initiate a transaction at the point-of-sale location of the merchant (e.g., by obtaining an identifier, such as by scanning a code, associated with a digital wallet of the merchant, etc.), or initiate a transaction with the merchant via a short-range wireless peer-to-peer communication (e.g., a near-field communication, a Bluetooth® communication, etc.) between the digital wallet application of the device of the user and an application of a point-of-sale device of the merchant. In yet another example, the transactions may be conducted between two users via exchanging identifying information (e.g., phone numbers, email addresses, etc.) associated with the digital wallets of the users. The systems, components, and techniques for enabling the transactions under these different scenarios will be described in more detail below.

FIG. 1 illustrates an electronic transaction system 100, within which the framework may be implemented according to one or more embodiments of the disclosure. The electronic transaction system 100 includes a service provider server 130, a merchant server 120, a merchant device 170, transaction processing systems 192 and 194, and user devices 110 and 180 that may be communicatively coupled with each other via a network 160. The network 160, in one embodiment, is implemented as a single network or a combination of multiple networks. For example, in various embodiments, the network 160 includes the Internet and/or one or more intranets, landline networks, wireless networks, and/or other appropriate types of communication networks. In another example, the network 160 comprises a wireless telecommunications network (e.g., cellular phone network) adapted to communicate with other communication networks, such as the Internet.

The user device 110, in one embodiment, is utilized by a user 140 to interact with the merchant server 120, the merchant device 170 of the merchant server 120 (e.g., a point-of-sale device, etc.), the transaction processing systems 192 and 194, the user device 180, and/or the service provider server 130 over the network 160. For example, the user 140 may use the user device 110 to conduct an online transaction or in-person transaction, such as a purchase or data/content access, with the merchant server 120 via websites hosted by, or mobile applications associated with, the merchant server 120. The user 140 may also use the user device 110 to conduct peer-to-peer transaction with another user (e.g., the user of the user device 180, etc.). The user 140 may further log into a user account to access account services or conduct electronic transactions (e.g., data access, account transfers or payments, etc.) with the service provider server 130 or one or more of the transaction processing systems 192 and 194. The user device 110, in various embodiments, is implemented using any appropriate combination of hardware and/or software configured for wired and/or wireless communication over the network 160. In various implementations, the user device 110 includes at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130.

The user device 110, in various embodiments, may include a wallet application 116 associated with a particular transaction processing system (e.g., the transaction processing system 194, etc.). For example, the user 140 may register with the transaction processing system 194. During the registration, the transaction processing system 194 may generate a digital wallet (e.g., a digital object that includes a particular data structure for storing payment source data, etc.) for the user 140. The wallet application 116 may be linked to the digital wallet generated for the user 140, and may provide an interface to the user 140 to access data associated with the digital wallet and access functionalities using the digital wallet of the user (e.g., initiate a payment transaction through the digital wallet, etc.). For example, the wallet application 116 may enable the user to initiate or use the digital wallet in an electronic transaction (e.g., an electronic purchase transaction, an electronic peer-to-peer fund transfer transaction, etc.). In response to receiving a request for a payment associated with an electronic transaction, the wallet application 116 may present a list of financial instruments that are linked to a user account of the user 140 and may enable the user 140 to select one or more financial instruments for conducting the electronic transaction. The wallet application 116 may also communicate with the transaction processing system 194 and/or the service provider server 130 to process the electronic transaction.

In some embodiments, the wallet application 116 may identify another participant (e.g., a user of the user device 180, a merchant associated with the merchant server 120, etc.) in the transaction via different methods, for example, by scanning a code (e.g., a QR code, etc.) associated with the other participant, by establishing a near-field communication (NFC) connection with another device (e.g., the merchant device 170 of the merchant, the user device 180, etc.) associated with the other participant, by providing a list of contacts associated with the user 140 and receiving a selection of one of the contacts from the user 140, by receiving an identifier (e.g., a phone number, an email address, etc.) from the user 140, etc. For example, when the user 140 is purchasing items from a store of a merchant, the user 140 may use the wallet application 116 to initiate a payment transaction with the merchant by scanning a code associated with the merchant, by establishing an NFC with a point-of-sale (POS) device (e.g., the merchant device 170, etc.) at the store, etc. In another example, when the user 140 initiates a funds transfer transaction, the wallet application 116 may receive, from the user 140, an identifier of the other participant (e.g., receiving a selection of a contact on the user device 110, receiving a phone number or other contact information of the recipient user, etc.). After receiving the identity of the other participant, the wallet application 116 may transmit information associated with the other participant in the payment transaction to the service provider server 130 to process the payment transaction.

Instead of using the wallet application 116, the user 140 may also access the digital wallet of the user 140 via another interface, such as the UI application 112. For example, when the user 140 is purchasing items from an online store, the user 140 may log on to the digital wallet account of the user 140 via the interface provided by the online store, and initiate the payment through the digital wallet of the user 140.

The user device 110, in one embodiment, includes at least one identifier 114, which may be implemented, for example, as operating system registry entries, cookies associated with the user interface application 112, identifiers associated with hardware of the user device 110 (e.g., a media access control (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard or a microphone) of the user device 110. For example, the user 140 may use the input component to interact with the UI application 112 (e.g., to conduct a purchase transaction with the merchant server 120 and/or the service provider server 130, to initiate a peer-to-peer funds transfer transaction with another user, etc.).

The user device 180 may include substantially the same hardware and/or software components as the user device 110, which may be used by a user to interact with the merchant server 120, the transaction processing systems 192 and 194, the service provider server 130, and/or other user devices such as the user device 110.

The merchant server 120, in various embodiments, may be maintained by a business entity (or in some cases, by a partner of a business entity that processes transactions on behalf of the business entity). Examples of business entities include merchants, resource information providers, utility providers, online retailers, real estate management providers, social networking platforms, a cryptocurrency brokerage platform, etc., which offer various items, content, and/or services for purchase and process payments for the purchases. The merchant server 120 may include a merchant database 124 storing data that enables identifying available items, content, or services, which may be made available to the user devices 110 and 180 for viewing and purchase by the respective users.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 (or a computer module that controls the user device 180 or the service provider server 130) may interact with the marketplace application 122 through the user interface application 112 over the network 160 to search and view various items, content, or services available for purchase in the merchant database 124, and initiating a purchase transaction with the merchant server 120.

The merchant server 120 may use one or more transaction processing systems (e.g., the transaction processing system 192, etc.) for processing transactions conducted with the merchant (e.g., purchase transactions for purchasing items from the merchant, etc.). For example, the merchant may register with the transaction processing system 192. During the registration, the transaction processing system 192 may generate a digital wallet (e.g., a digital object that includes a particular data structure for storing payment source data, etc.) for the merchant. In some embodiments, the digital wallet generated for the merchant may be in a different format (or data structure) than the digital wallet generated for the user 140 because the transaction processing systems 192 and 194 may be incompatible with each other. After generating the digital wallet, the merchant server 120 may conduct transactions through the digital wallet using the transaction processing system 192, where the transaction processing system 192 may process the transaction and either credit funds to the digital wallet (e.g., in a purchase transaction where a consumer is purchasing one or more items from the merchant, etc.) or debit funds from the digital wallet (e.g., in a refund transaction, etc.).

The merchant server 120, in one embodiment, may be associated with the merchant device 170, which may be implemented as a point-of-sale device of a store associated with the merchant. The merchant device 170 may process payment transactions between the merchant server 120 and consumers of the merchant (e.g., the user 140). For example, when the user 140 initiates a payment transaction with the merchant server 120 using the digital wallet of the user 140 (e.g., by providing information associated with the digital wallet of the user 140 to the merchant device 170 via a short-range peer-to-peer communication, etc.), the merchant device 170 may process the payment transaction using information provided by the digital wallet, for example, by transmitting a transaction request to the transaction processing system 192 via a payment network. The transaction request may include digital wallet information associated with the digital wallet of the merchant, transaction details such as an amount, descriptions of the one or more items, etc., and digital wallet information of the digital wallet of the user 140.

While only one merchant server 120 is shown in FIG. 1, it has been contemplated that multiple merchant servers, each associated with a different merchant, may be connected to the user device 110 and the service provider server 130 via the network 160.

Each of the transaction processing systems 192 and 194 may be associated with a transaction processor that is configured to process transactions between different digital wallets (e.g., transferring funds from one digital wallet to another digital wallet, etc.). Example transaction processing systems may include PayPal One Touch®, Apple Pay®, Samsung Pay®, Venmo, Google Pay®, Cash App®, Alipay®, WeChat Pay®, Unified Payment Interface (UPI)®, etc. When a transaction processing system receives a transaction request (e.g., from a digital wallet application such as the wallet application 116, from a point-of-sale device such as the merchant device 170, from an application of the merchant such as the marketplace application 122, etc.), the transaction processing system may process the transaction using transaction data that is included in the transaction request. For example, the transaction processing system may use one or more computer programs (e.g., computer models such as machine learning models, etc.) to authenticate and verify the digital wallet of the sender and the digital wallet of the recipient in the transaction. After authenticating and verifying the digital wallets involved in the transaction, the transaction processing system may process the transaction by transferring funds (or data) from one digital wallet to another digital wallet.

When both of the digital wallets involved in the transaction are part of the same transaction processing system (e.g., registered with the same transaction processing system, etc.), the transaction processing system has access to the information of the digital wallets (e.g., profile information of the user associated with the digital wallet, a transaction history of the digital wallet, transaction patterns associated with the digital wallet, etc.) to authenticate and verify the digital wallets, and to subsequently process the transaction by transferring funds between the digital wallets. However, when at least one of the digital wallets involved in a transaction is not associated with or accessible by the transaction processing system, the transaction processing system may not be able to process the transaction on its own. For example, when the merchant server 120 receives a checkout request via a user interface (e.g., a website) provided by the merchant application 122 for a purchase from the user 140, the merchant server 120 may transmit a transaction request to the transaction processing system 192 that is associated with the digital wallet of the merchant. Based on the transaction data included in the transaction request, the transaction processing system 192 may determine that the digital wallet of the user 140 is not associated with the transaction processing system 192. The transaction processing system 192 may determine that it cannot process the transaction on its own (e.g., lacks the resources to process the transaction). As such, the transaction processing system 192 may communicate with the service provider server 130 and access the functionalities provided by the service provider server 130 to process the transaction.

In some embodiments, the service provider server 130 implements the computer framework as disclosed herein. The service provider server 130, in one embodiment, is maintained by a transaction processing entity or an online service provider, which provides processing of electronic transactions between users (e.g., the user 140 and users of other user devices, etc.) and/or between users and one or more merchants. The service provider server 130 includes a service application 138, which may be adapted to interact with the user device 110, user device 180, merchant device 170, and/or the merchant server 120 over the network 160 to facilitate the electronic transactions (e.g., electronic payment transactions, data access transactions, interactions, such as chat sessions, etc.) among users and merchants processed by the service provider server 130. In one example, the service provider server 130 is provided by PayPal®, Inc., of San Jose, California, USA.

In some embodiments, the service application 138 includes a payment processing application (not shown) for processing purchases and/or payments for electronic transactions between a user and a merchant or between any two entities (e.g., between two users, between two merchants, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 also includes an interface server 134 that is configured to serve content (e.g., web content) to users and interact with users. For example, the interface server 134 includes a web server configured to serve web content in response to HTTP requests. In another example, the interface server 134 includes an application server configured to interact with a corresponding application (e.g., a service provider mobile application) installed on the user devices 110 and 180 via one or more protocols (e.g., RESTAPI, SOAP, etc.). As such, the interface server 134 may include pre-generated electronic content ready to be served to users. For example, the interface server 134 stores a log-in page and is configured to serve the log-in page to users for logging into user accounts (e.g., digital wallets, etc.) of the users to access various services provided by the service provider server 130. The interface server 134 may also include other electronic pages associated with the different services (e.g., electronic transaction services, etc.) offered by the service provider server 130. As a result, a user (e.g., the user 140, the user of the user device 180, or a merchant associated with the merchant server 120, etc.) may access a user account associated with the user and access various services offered by the service provider server 130, by generating HTTP requests directed at the service provider server 130.

The service provider server 130, in one embodiment, is configured to maintain one or more user accounts and merchant accounts in an accounts database 136, each of which may be associated with a profile and may include account information associated with one or more individual users (e.g., the user 140 associated with user device 110, the user associated with the user device 180, etc.) and merchants. For example, account information includes private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions. It is noted that the accounts database 136 (and/or any other database used by the system disclosed herein may be implemented within the service provider server 130 or external to the service provider server 130 (e.g., implemented in a cloud, etc.).

In one implementation, a user has identity attributes stored with the service provider server 130, and the user has credentials to authenticate or verify identity with the service provider server 130. User attributes may include personal information, banking information and/or funding sources. In various aspects, one or more of the user attributes are passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a universal transaction platform 132 that facilitates processing of transactions between digital wallets (e.g., digital wallets that are associated with different transaction processing systems, etc.). The transaction module 132 may communicate with the merchant server 120, the merchant device 170, the transaction processing systems 192 and 194, and/or the user devices 110 and 180 to provide the functionalities disclosed herein. For example, the universal transaction platform 132 may provide a discovery service that enables various applications, such as a point-of-sale application of a merchant (e.g., the merchant device 170), the marketplace application 112 of the merchant server 120, the wallet application 116 of the user device 110, and/or payment processing applications associated with the transaction processing system 192 and 194 to discover information associated with digital wallets that are registered with different transaction processing systems. The information enables these applications to provide enhanced functionalities (e.g., user interface interactions with their respective users, etc.). Furthermore, the universal transaction platform 132 may also provide transaction processing services that enable the transaction processing systems 192 and 194 to process transactions that involve digital wallets associated with disparate and incompatible transaction processing systems.

Figure 2:
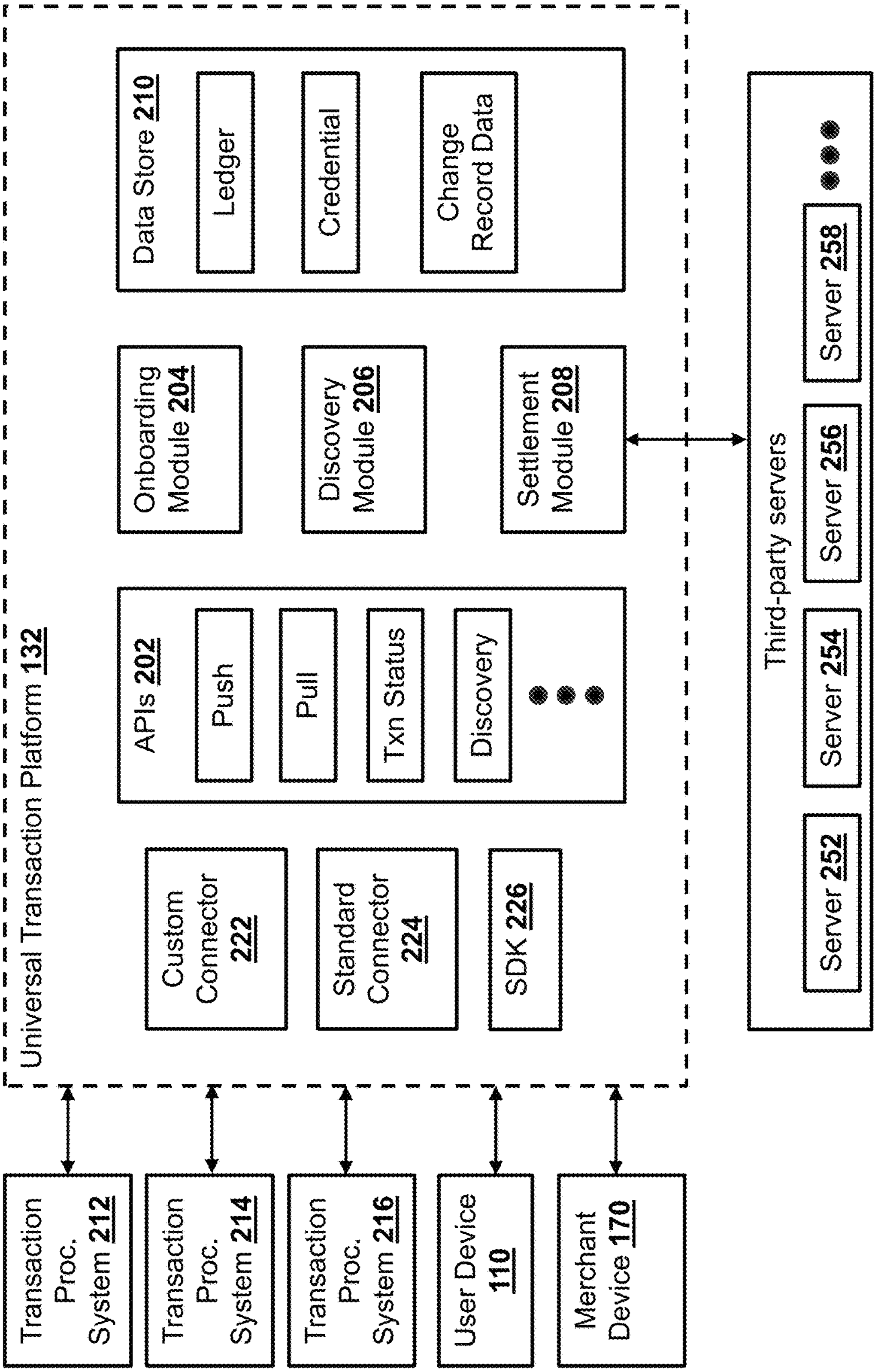
FIG. 2 is a block diagram illustrating a universal transaction platform according to an embodiment of the present disclosure.

FIG. 2 illustrates a block diagram of the universal transaction platform 132 according to an embodiment of the disclosure. The universal transaction platform 132 may act as a bridge between different transaction processing systems 212, 214, and 216 for processing transactions across the different transaction processing systems. In some embodiments, at least some of the transaction processing systems 212, 214, and 216 may correspond to the transaction processing systems 192 and 194 in FIG. 1. As shown in FIG. 2, the universal transaction platform 132 includes a custom connector 222, a standard connector 224, a software development kit (SDK) 226, application programming interfaces (API) 202, an onboarding module 204, a discovery module 206, a settlement module 208, and a data store 210. The universal transaction platform 132 may use one of the custom connector 222 or the standard connector 224 to communicate with each of the transaction processing systems 212, 214, and 216. In some embodiments, the universal transaction platform 132 may provide the SDK 226 to other devices, such as the user device 110, the user device 180, the merchant device 170, and/or the merchant server 120, which may be used by the respective devices in the facilitating of transactions through the universal transaction platform 132. For example, after installing the SDK 226 on the devices, the SDK 226 may communicate with the universal transaction platform 132 to process transactions among different digital wallets.

In some embodiments, the onboarding module 204 is configured to integrate new transaction processing systems and/or user devices into the universal transaction platform 132. For example, when the onboarding module 204 receives an onboarding request from one of the transaction processing systems 212, 214, and 216, the onboarding module 204 may obtain, from the transaction processing platform, information associated with the transaction processing system (e.g., a geographical region in which the transaction processing system operates, a format of the digital wallets, a communication protocol used by the transaction processing system, etc.). The onboarding module 204 may store the information in the data store 210. The onboarding module 204 may then determine whether the universal transaction platform 132 can communicate with the transaction processing system using the standard connector 224 based on the information. If the onboarding module 204 determines that it cannot communicate with the transaction processing system using the standard connector 224, the onboarding module 204 may configure and/or generate a custom connector (e.g., the custom connector 222) for communicating with the transaction processing platform. The onboarding module 204 may generate or otherwise obtain credential information for the transaction processing system, and store the credential information in the data store 210. The onboarding module 204 may also obtain, from the transaction processing system, digital wallet information associated with digital wallets that are registered with the transaction processing system. The onboarding module 204 may also store the digital wallet information in the data store 210.

After onboarding the different transaction processing systems 212, 214, and 216, the universal transaction platform 132 may be communicatively connected with the payment systems 212, 214, and 216 to facilitate transactions across the different transaction processing systems 212, 214, and 216 (e.g., facilitating transactions among digital wallets that are associated with different transaction processing systems, etc.). For example, when an application associated with one of the transaction processing systems (e.g., the transaction processing system 212) receives a transaction request for processing a transaction between two digital wallets, the transaction processing system 212 may determine that it is incapable of processing the transaction on its own because it does not recognize one of the digital wallets (e.g., the digital wallet may be associated with a different transaction processing system, such as the transaction processing system 214, etc.). As such, the transaction processing system 212 and/or the application may transmit a discovery API call to the universal transaction platform 132 based on the identifying information associated with the digital wallet (e.g., a phone number, an email address, etc.). The discovery module 206 may access information associated with the digital wallet that matches the identifying information received in the discovery API call based on the digital wallet information provided by the different transaction processing systems 212, 214, and 216, and may provide the information to the application and/or the transaction processing system 212 as a response to the discovery API call. The information may include data that specifies a transaction processing system (e.g., the transaction processing system 214) with which the digital wallet is registered, and data associated with a user of the digital wallet (e.g., a name, a geographical region, etc.).

The application may then provide enhanced services to a user based on the information provided by the universal transaction platform 132 for processing the transaction. For example, when the application is a payment processing application integrated within a checkout process of a merchant website, the application may provide additional content on a user interface of a device (e.g., the user device 110, etc.) based on the information received via the discovery API call, such as displaying the name of the transaction processing system 214 and the name of the user on the user interface. In some embodiments, based on the information, the application may also generate and/or execute a redirect request (e.g., a uniform resource locator (URL) redirect request, etc.) for redirecting the user of the device to another user interface associated with the transaction processing system 214, such that the transaction processing system 214 may authenticate the user and/or verify the digital wallet of the user 140 for the transaction.

After obtaining the information provided via the discovery API call, the transaction processing system 212 and/or the transaction processing system 214 may request to process the transaction by transmitting a push API call or a pull API call to the universal transaction platform 132. The choice of making a push API call or a pull API call depends on whether the initiating transaction processing system is associated with a digital wallet involved in the transaction that receives funds from another digital wallet or transmits funds to another digital wallet. For example, if the transaction processing system 214 associated with the digital wallet of the user 140 who is making a purchase from a merchant initiates the transaction processing request, the transaction processing system 214 may transmit a push API call to the universal transaction platform 132. On the other hand, if the transaction processing system 212 associated with the digital wallet of the merchant initiates the transaction processing request, the transaction processing system 212 may transmit a pull API call to the universal transaction platform 132. In some embodiments, the transaction processing system that transmits the API call may include, as the parameters of the push API call or the pull API call, information associated with the transaction and the two digital wallets (e.g., identifiers associated with the digital wallets, identifiers of the transaction processing systems associated with the digital wallets, an amount, etc.).

When the universal transaction platform 132 receives a transaction processing request (e.g., via a push API call or a pull API call from the transaction processing system, etc.), the settlement module 208 of the universal transaction platform 132 may process the transaction based on the information included in the API call. For example, the settlement module 208 may determine the transaction processing systems associated with the digital wallets involved in the transaction (e.g., the transaction processing system 212 associated with the digital wallet of the merchant, the transaction processing system 214 associated with the digital wallet of the user 140, etc.) based on the parameters included in the API call, and may communicate with the transaction processing systems 212 and 214 to process the transaction.

In some embodiments, the settlement module 208 may communicate with one or more third-party servers, such as one or more of the servers 252, 254, 256, and 258, for processing the transaction. Each of the servers 252, 254, 256, and 258 may correspond to (e.g., being a part of, etc.) a corresponding transaction processing system. For example, the server 252 may correspond to the transaction processing system 212 and configured to process transactions for digital wallets associated with (e.g., registered with, etc.) the transaction processing system 212. The server 254 may correspond to the transaction processing system 214 and configured to process transactions for digital wallets associated with (e.g., registered with, etc.) the transaction processing system 214. The server 256 may correspond to the transaction processing system 216 and configured to process transactions for digital wallets associated with (e.g., registered with, etc.) the transaction processing system 216.

As such, after determining that the transaction processing systems 212 and 214 are involved in the transactions, the settlement module 208 may communicate with the servers 252 and 254 for processing the transaction. For example, the settlement module 208 may transmit a transaction request to each of the servers 252 and 254 based on the respective digital wallet information. The transaction request may cause each of the servers 252 and 254 to authenticate and verify the respective digital wallets involved in the transaction. As such, based on the transaction request, the server 252 may authenticate and verify the digital wallet of the merchant, and the server 254 may authenticate and verify the digital wallet of the consumer (e.g., the user 140). During the authentication and verification process, the server 254 may generate and provide a user interface presented on the user device 110 of the user 140 for authenticating the user 140. For example, the server 254 may generate a security code (e.g., a random number, etc.), and transmit the security code to a trusted device (e.g., the user device 110 or another device associated with the user 140, etc.) of the user 140 (e.g., via a push notification, a pop-up window of the user device 110 or another device of the user 140, etc.). The server 254 may then prompt the user 140, via the user interface, for the security code to verify the user 140's possession of the trusted device. The server 254 may also prompt the user 140 for a selection of a payment source used for the transaction and may verify that the payment source selected by the user 140 for the transaction has sufficient funds for the transaction based on the amount associated with the transaction. If the payment source does not have sufficient funds for the transaction, the server 254 may deny the transaction, and transmit a transaction failure signal back to the settlement module 208. The settlement module 208 may then relay the transaction failure signal to the transaction processing system and/or the merchant server 120.

Each of the servers 252 and 254 may also include one or more computer programs (e.g., computer models such as machine learning models, etc.) configured to authenticate and verify digital wallets that are involved in a transaction when processing the transaction. The one or more computer programs may be configured to analyze information associated with a digital wallet (e.g., profile information of the user associated with the digital wallet, a transaction history of the digital wallet, transaction patterns associated with the digital wallet, etc.) and authenticate/verify the digital wallet based on analyzing the information. In some embodiments, the one or more computer programs may determine a likelihood that the transaction is a fraudulent transaction based on various factors such as transaction information associated with the transaction to be processed, a transaction history of the digital wallet of the user, profile information associated with the user, etc. For example, when the transaction deviates from previous transactions conducted by the user 140 by a threshold (e.g., different items, different merchants, different transaction amounts, etc.), the one or more computer programs may determine that the transaction is fraudulent. Based on the information provided by the universal transaction platform 132 and the respective users (e.g., via communicating with the users, etc.), each of the servers 252 and 254 may use the corresponding one or more computer programs to authenticate and/or verify the respective digital wallet of the user involved in the transaction. For example, one or more computer programs of the server 254 may analyze the digital wallet information associated with the digital wallet of the user 140, and may generate an output that indicates a likelihood that the transaction is legitimate based on the digital wallet information associated with the digital wallet of the user 140. Similarly, one or more computer programs of the server 252 may analyze the digital wallet information associated with the digital wallet of the merchant, and may generate an output that indicates a likelihood that the transaction is legitimate based on the digital wallet information associated with the digital wallet of the merchant.

Since different transaction processing systems may use different techniques and/or algorithms to analyze the digital wallets involved in a transaction, the one or more computer programs used by each of the servers 252 and 254 may include logics and parameters for analyzing digital wallets that are specific to the corresponding transaction processing system. In order for each of the servers 252 and 254 to process (e.g., to authorize) the transaction between the two digital wallets, each of the servers 252 and 254 may also need to use its own techniques and/or algorithms to analyze the digital wallet associated with the other transaction processing system using the one or more computer programs.

For example, the server 252 may need to use the corresponding one or more computer programs to analyze the digital wallet of the user 140, and the server 254 may need to use the corresponding one or more computer programs to analyze the digital wallet of the merchant.

However, the server 252 may not have access to the digital wallet information associated with the digital wallet of the user 140 needed for the one or more computer programs to analyze the digital wallet, since the digital wallet of the user 140 is associated with a different transaction processing system (e.g., the transaction processing system 214). Similarly, the server 254 may not have access to the digital wallet information associated with the digital wallet of the merchant needed for the one or more computer programs to analyze the digital wallet, since the digital wallet of the merchant is associated with a different transaction processing system (e.g., the transaction processing system 212).

As such, in some embodiments, the universal transaction platform 132 may facilitate the analyses of different digital wallets for the different transaction processing systems in the processing of the transaction. For example, the server 254 may transmit the corresponding one or more computer programs associated with the transaction processing system 214 (e.g., executable binary code, the logic associated with the one or more programs, such as pseudocode, a decision tree, etc.) to the universal transaction platform 132. The universal transaction platform 132 may re-generate the one or more programs based on the logic, and execute the one or more computer programs using the information of the digital wallet of the merchant that is stored in the data store 210. Alternatively, the universal transaction platform 132 may transmit the one or more computer programs (e.g., executable binary code, pseudocode, etc.) associated with the transaction processing system 214 to the server 252, and request the server 252 to execute the one or more computer programs using the information of the digital wallet of the merchant stored within the transaction processing system 212. Based on analyzing the information of the digital wallet of the merchant, the one or more computer programs may generate one or more outputs, which may indicate whether the digital wallet of the merchant is authenticated/verified. The universal transaction platform 132 may transmit the one or more outputs to the server 254, such that the server 254 may determine whether to authorize or deny the transaction based on the analyses of the digital wallets.

Similarly, the server 252 may transmit, to the universal transaction platform 132, one or more computer programs that are used by the transaction processing system 212 to authenticate and/or verify digital wallets involved in a transaction. The universal transaction platform 132 may execute the one or more computer programs using the information associated with the digital wallet of the user 140 stored in the data store 210. Alternatively, the universal transaction platform 132 may transmit the one or more computer programs to the server 254, and request the server 254 to execute the one or more computer programs using the information of the digital wallet of the user 140 stored within the transaction processing system 214. Based on analyzing the information of the digital wallet of the user 140, the one or more computer programs may generate one or more outputs, which may indicate whether the digital wallet of the user 140 is authenticated/verified. The universal transaction platform 132 may transmit the one or more outputs to the server 252.

After authenticating and verifying the digital wallets involved in the transaction, each of the servers 252 and 254 may process their corresponding portions of the transaction by modifying the respective digital wallets. For example, the server 254 may debit funds from the digital wallet of the user 140 based on the amount associated with the transaction, and the server 252 may credit funds to the digital wallet of the merchant based on the amount associated with the transaction. The servers 252 and 254 may exchange the funds via the universal transaction platform 132. For example, the server 254 may transfer the funds debited from the digital wallet of the user 140 to a digital wallet of the universal transaction platform 132, and the universal transaction platform 132 may transfer the funds to the server 252 to complete the transaction.

In some embodiments, the universal transaction platform 132 may also provide a transaction status inquiry functionality via the APIs 202. For example, the transaction processing system 212 and/or the transaction processing system 214 may inquire about the status of the transaction (e.g., whether the transaction is being processed, whether the transaction has been processed, whether the transaction has been initiated, etc.). The universal transaction platform 132 may provide the status of the transaction, as a response to the transaction status API, based on information stored in the data store 210.

Figure 3:
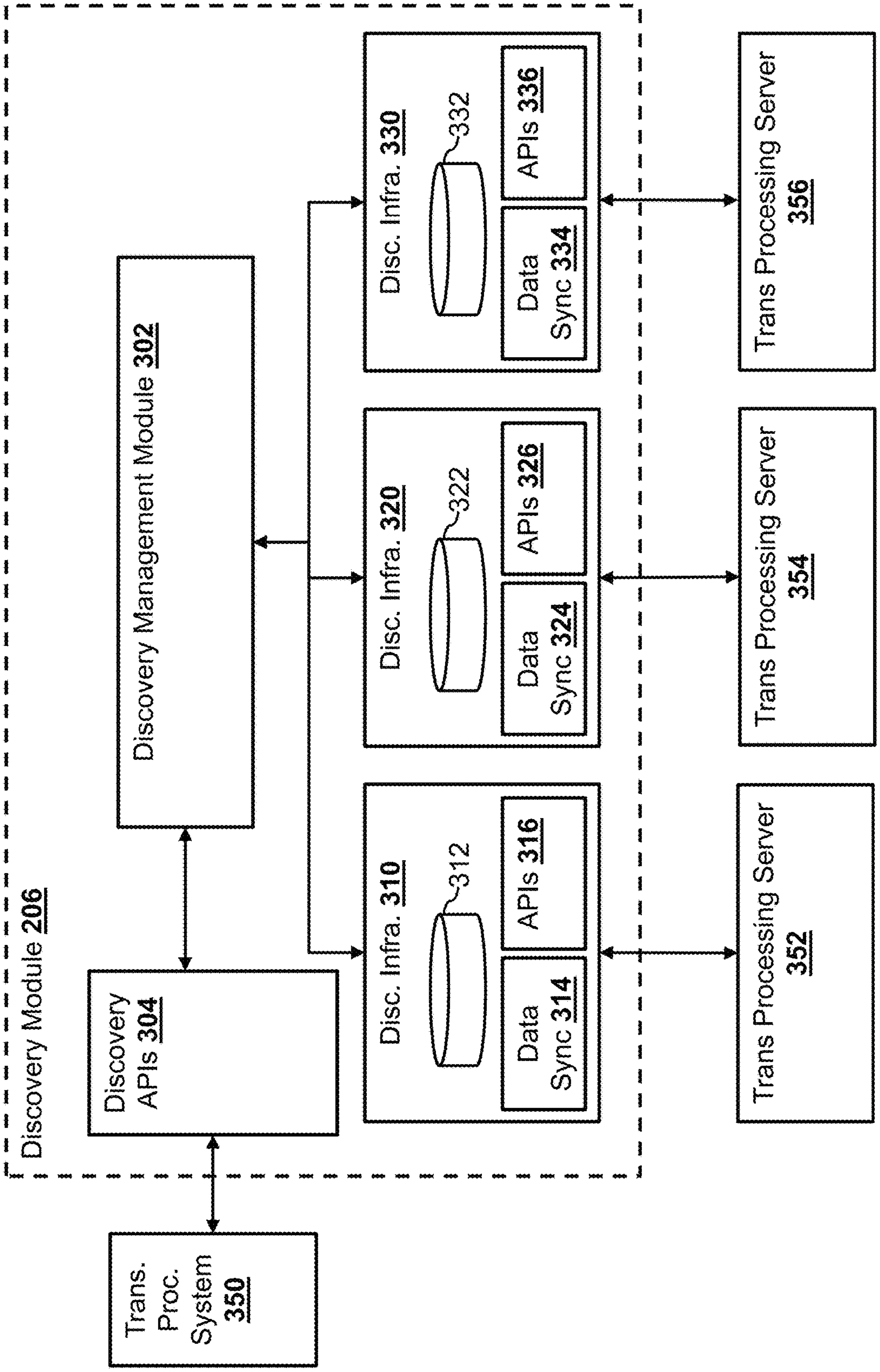
FIG. 3 is a block diagram illustrating a discovery module according to an embodiment of the present disclosure.

FIG. 3 illustrates a block diagram of the discovery module 206 according to an embodiment of the disclosure. The discovery module 206 includes discovery APIs 304, a discovery management module 302, and discovery infrastructures 310, 320, and 330. Each of the discovery infrastructures may correspond to one or more transaction processing systems, and store digital wallet information of digital wallets that are registered with the corresponding one or more transaction processing systems. For example, the discovery infrastructure 310 may correspond to a first transaction processing system that includes a transaction processing server 352 (or "server 352"), the discovery infrastructure 320 may correspond to a second transaction processing system that includes a transaction processing server 354 (or "server 354"), and the discovery infrastructure 330 may correspond to a third transaction processing system that includes a transaction processing server 356 (or "server 356"). In some embodiments, the discovery module 206 may assign transaction processing systems to the different discovery infrastructures based on one or more factors, such as the geographical regions associated with the transaction processing system. Thus, the discovery infrastructure 310 may be associated with a first geographical region (e.g., North America, South America, individual or groups of countries in North America or South America, etc.), the discovery infrastructure 320 may be associated with a second geographical region (e.g., Asia, individual or groups of countries in Asia, etc.), and the discovery infrastructure 330 may be associated with a third geographical region (e.g., Europe, individual or groups of countries in Europe, etc.), which can be based on common regulations or processes for countries or groups in the region. Since multiple transaction processing systems may operate and serve users in a single geographical region, it has been contemplated that each of the discovery infrastructures 310, 320, and 330 may be associated with more than one transaction processing system, and may be connected with more than one server.

Each of the discovery infrastructures 310, 320, and 330 includes a data storage, a data synchronization module, and one or more APIs for communicating with the corresponding servers. For example, the discovery infrastructure 310 includes a data storage 312, a data synchronization module 314, and APIs 316 for communicating with the server 352.

The discovery infrastructure 320 includes a data storage 322, a data synchronization module 324, and APIs 326 for communicating with the server 354. The discovery infrastructure 330 includes a data storage 332, a data synchronization module 334, and APIs 336 for communicating with the server 356. Each of the data synchronization modules 314, 324, and 334 may use the corresponding APIs 316, 326, and 336 to communicate with the corresponding servers 352, 354, and 356. For example, the data synchronization module 314 may use an API to pull digital wallet information from the server 352 (or the server 352 may use another API to push the digital information to the discovery infrastructure 310. The digital wallet information may include different data objects representing the different digital wallets that are registered with the server 352. Each data object may include data associated with a corresponding digital wallet in a particular arrangement (e.g., format). The data may include an identifier (e.g., a name, a code, etc.) that specifies the transaction processing system with which the digital wallet is associated, an identifier (e.g., an account number, etc.) of the digital wallet, a status of the digital wallet (e.g., active, suspended, deactivated, etc.), information associated with the user, such as a name, a phone number, an email address, etc., a geographical region in which the transaction processing system operates, a currency used by the digital wallet, etc.

When the data synchronization module 314 receives the data objects from the server 352, the data synchronization module 314 may generate a data record for each of the data objects. In some embodiments, the data synchronization module 314 may encrypt at least some of the digital wallet information included in the data object (e.g., at least a portion of the identifier of the digital wallet, sensitive information associated with the user of the digital wallet, etc.) to enhance the data security of the digital wallet information, and may store the encrypted digital wallet information in the record. The record may be implemented as a key-value pair, with identifying information usable for identifying the digital wallet (e.g., the phone number of the user, the email address of the user, etc.) stored as a key of the record and the encrypted digital wallet information (or partially encrypted digital wallet information) stored as the value of the record. In some embodiments, the data synchronization module 314 may also generate a hash value for the identifying information (e.g., by applying one or more hash algorithms to the identifying information, etc.), and may use the hash value instead of the identifying information as the key of the record to further enhance the data security of the data record. The data synchronization module 314 may then store the data records in the data storage 312 of the discovery infrastructure 310, using the keys of the records as the primary keys of the data storage 312.

Each of the data synchronization modules 324 and 334 may perform the same process using the corresponding APIs (e.g., the APIs 326, the APIs 336, etc.) as discussed above to import digital wallet information from the corresponding server (e.g., the server 354, the server 356, etc.) into the corresponding data store (e.g., the data store 322, the data store 332, etc.).

In some embodiments, each of the transaction processing systems may have a data retention policy associated with the data objects provided to the universal transaction platform 132. The data retention policy may be specified based on the transaction processing system and/or compliance and regulatory policies of a region in which the transaction processing system operates. The data retention policy specifies a period of time within which the universal transaction platform 132 may store information associated with the data objects. As such, the discovery module 206 may continuously monitor the status of each data record stored in the one or more database systems, and may determine an expiration time for each data record based on the data retention policy of the associated transaction processing system. For example, when any one of the data synchronization modules 314, 324, and 334 determines that a data record stored in the corresponding data store has expired (e.g., has been stored within the data store for a period of time longer than the time specified in the corresponding data retention policy, etc.), the data synchronization module may discard (e.g., delete, remove, perform other data management actions, etc.) the data record from the corresponding data store. The data retention policy (e.g., a length of time in which the universal transaction platform 132 is allowed to store the data objects, etc.) of a transaction processing system may be determined based in part on the particular geographical region associated with the transaction processing system, such that the data retention policy transaction processing systems associated with the same region may have similar (e.g., within a length of time threshold, etc.) or the same data retention policy. As such, the separation of data records in different discovery infrastructures 310, 320, and 330 according to the regions may enable the discovery module 206 to improve the efficiency in monitoring and enforcing the data retention policies of the different transaction processing systems. For example, each of the data synchronization modules 314, 324, and 334 may only need to apply a single set of the data retention policies associated with a corresponding region to all of the data records stored in the corresponding data store.

In some embodiments, one or more of the discovery infrastructures 310, 320, and 330 may receive updates from the servers 352, 354, and 356 via the APIs 316, 326, and 336. Based on the updates, the data synchronization module may update the data records stored in the corresponding data store. The updates may specify changes to one or more of the digital wallets, such as a change of the status (e.g., the digital wallet is suspended or locked, etc.), a change of the corresponding user's information, a change in funding source information, a change of currency information, etc.

When the discovery module 206 receives a discovery request via one of the discovery APIs 304 (e.g., from a transaction processing system 350, etc.), the discovery management module 302 may query one or more of the discovery infrastructures 310, 320, and 330 for digital wallet information of a digital wallet. As discussed herein, the discovery request may include identifying information that is usable to identify a digital wallet that is registered with one of the transaction processing systems. The identifying information may be received as one of the parameters in the discovery API 304, and may include a phone number, an email address, and/or any other information that is unique to a user of the digital wallet. The discovery management module 302 may use the identifying information to query the discovery infrastructures 310, 320, and 330 for a data record that includes a key that matches the identifying information included in the discovery request. In some embodiments, since the data records are organized in the discovery infrastructures 310, 320, and 330 according to the geographical regions associated with the respective transaction processing systems, the discovery management module 302 may identify a region based on the identifying information (e.g., a country code in the phone number, etc.), and may select one of the discovery infrastructure corresponding to the region for querying without querying other discovery infrastructures. This way, the discovery management module 302 may improve the computer resource and time efficiency by eliminating unnecessary querying of discovery infrastructure.

The discovery management module 302 may identify a data record based on matching the identifying information included in the discovery request and a key of the data record. It is possible that multiple data records may be identified based on the identifying information, for example, when the same user registers for multiple digital wallets (e.g., each digital wallet with a different transaction processing system, etc.). The digital wallet(s) identified for the discovery request may be associated with a different transaction processing system (and/or a different region) from the transaction processing system 350 that transmitted the discovery request. As such, the discovery functionalities provided by the discovery module 206 may enable transaction processing systems to discover digital wallet information of digital wallets that are registered with different transaction processing systems and from different regions, which enable the processing of transactions between digital wallets across different transaction processing systems and/or regions.

In some embodiments, the discovery management module 302 generates one or more data objects based on digital wallet information included in the one or more data records identified for the discovery request. The data object may include information associated with the transaction processing system associated with the digital wallet (e.g., a name of the transaction processing system, etc.), information associated with the user, such as a name of the user, etc., and other information. The discovery management module 302 may then transmit the data objects back to the transaction processing system 350 as a response to the discovery request.

Due to the various data retention policies associated with the different transaction processing systems, the discovery infrastructures 310, 320, and 330 may not include digital wallet information of all of the digital wallets associated with the different transaction processing systems. For example, digital wallet information of some of the digital wallets that were stored in one or more of the discovery infrastructures 310, 320, and 330 may have been removed based on the corresponding data retention policies. Some of the data retention policies may even disallow storing of the digital wallet information within the discovery infrastructures 310, 320, and 330. As such, if the discovery management module 302 does not identify any data records stored in the discovery infrastructures 310, 320, and 330 that match the identifying information included in the discovery request, the discovery management module 302 may transmit a query request to the different servers 352, 354, and 356 associated with the different transaction processing systems. When one of the servers 352, 354, and 356 determines a match between the identifying information and a digital record registered with the corresponding transaction processing system, the server may transmit a data object that includes digital wallet information of the digital wallet to the discovery module 206 as a response to the query request. Note that it may be possible that a single one of servers 352, 354, or 356 does not have the necessary information for verifying or authenticating a digital wallet, but that a combination of two or more servers does. In that case, calls or queries may be made to and data received from multiple servers to obtain the desired information.

The discovery management module 302 may transmit the data object(s) received from one or more of the servers 352, 354, and 356 to the transaction processing system 350 as a response to the discovery request. In some embodiments, the discovery management module 302 may also generate a data record for each of the data object(s) using the techniques described herein, and store the data record(s) in one or more of the data stores 312, 314, and 316 according to the data retention policies associated with the transaction processing system(s).

FIGS. 4A-7B illustrate different use cases of digital wallet transactions conducted via the universal transaction platform 132 according to various embodiments of the disclosure. The operations of the universal transaction platform 132 and the discovery module 206 will be further explained via the use cases illustrated in FIGS. 4-7.

Figure 4A:
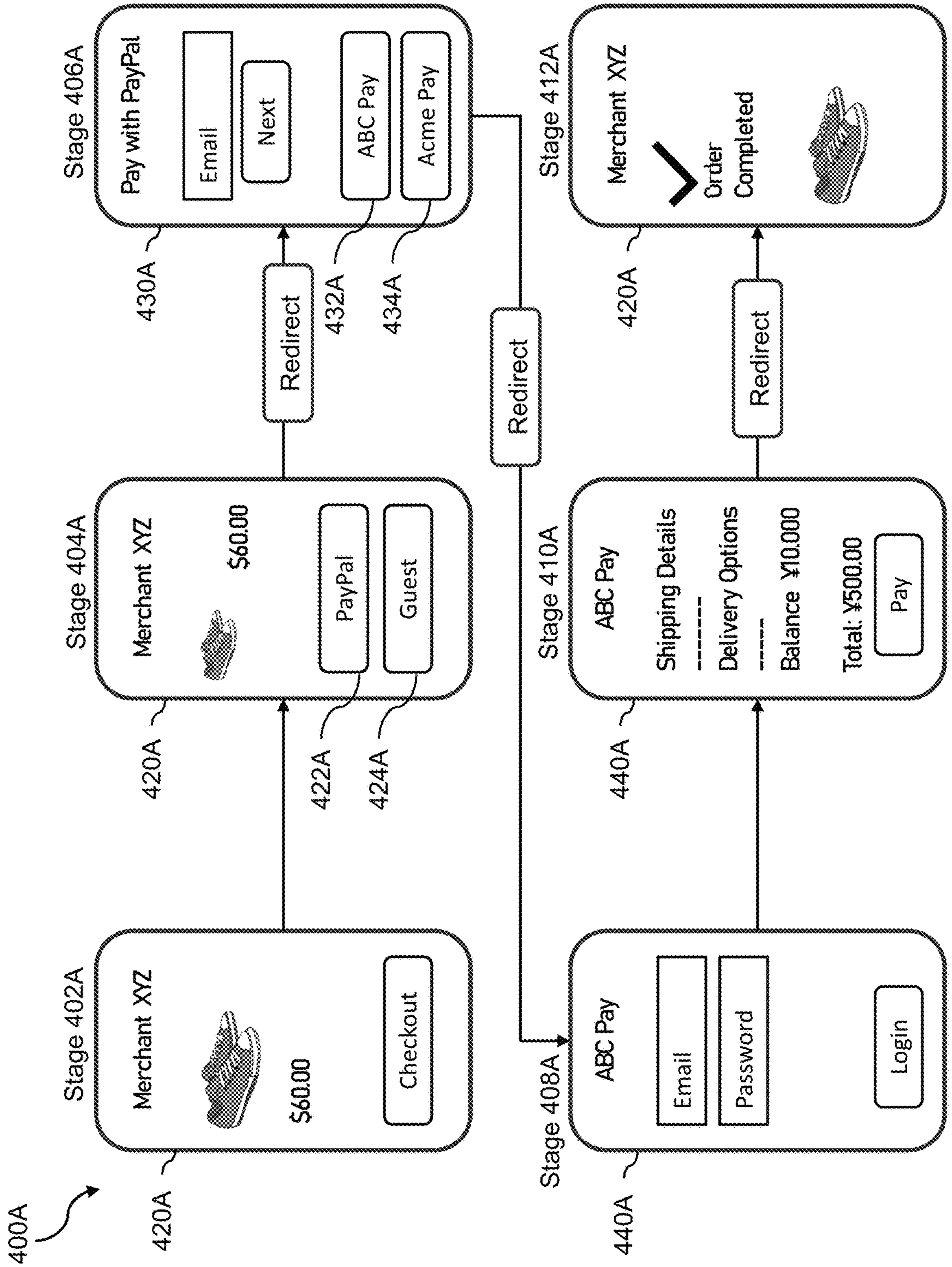
FIG. 4A illustrates an example user interface flow for conducting a transaction using the universal transaction platform according to an embodiment of the present disclosure.

FIG. 4A illustrates an example user interface flow 400A for conducting a transaction according to an embodiment of the disclosure. In the example illustrated in the user interface flow 400A, a user (e.g., the user 140) is purchasing one or more items from an online merchant (e.g., Merchant XYZ). For example, the user 140 may use a browser application (e.g., the UI application 112 of the user device 110) to browse merchant data stored on a merchant server (e.g., the merchant server 120, etc.) via a user interface provided by the merchant (e.g., a website of Merchant XYZ). An application (e.g., a web application, etc.) being hosted by the merchant server may provide the user interface on the user device, which enables the user to browse items of the merchant and to initiate a purchase transaction for purchasing one or more items from the merchant. For example, the user may select one or more items for purchase by interacting with the merchant website. In this example, the user has selected a pair of shoes. The user may then navigate to a checkout page of the merchant website, as shown in stage 402A, where the item selected for purchase (e.g., the pair of shoes), a price of the item, and a 'checkout' button are presented on a user interface 420A of a user device. Since the merchant (and/or the user) in this example is located in the United States, the price is shown in U.S. Dollars.

Stage 404A illustrates the user interface 420A after the user has selected the 'checkout' button. As part of the checkout process of the merchant, the application may present, on the user interface 420A, a summary of the purchase, and provides different payment options for paying for the item. In this example, the merchant is associated with a first transaction processing system (e.g., the merchant has a digital wallet that is registered with the first transaction processing system, such as the transaction processing system 212, etc.), which may correspond to a PayPal® payment processing system. Based on the relationship between the merchant and the transaction processing system 212, the transaction processing system 212 may provide payment processing functionalities via the user interface of the merchant. In some embodiments, the transaction processing system 212 may provide an application (e.g., a software development kit (SDK), etc.) that can be integrated within the application of the merchant (e.g., integrated within the website). The integration of the SDK within the merchant website enables the merchant website to present one or more payment options associated with the transaction processing system 212 on the user interface. In this example, the SDK enables the merchant website to present, on the user interface 420A, a payment button 422A which indicates a name of the transaction processing system 212 (e.g., "PayPal"). A selection of the payment button 422A may trigger a payment flow provided by the transaction processing system 212. The user interface 420A also present a payment button 424A which corresponds to 'guest checkout' button, which enables the user to manually enter payment information for paying for the purchase without using a digital wallet. In some embodiments, if the merchant is associated with another transaction processing system (e.g., if Merchant XYZ has another digital wallet registered with another transaction processing system, etc.), the other transaction processing system may provide an SDK that enables the merchant website to provide additional payment options on the user interface 420A (not shown).

If the user selects the 'PayPal' payment button 422A, the merchant website, via the SDK integrated within the merchant website, may redirect the user from the user interface 420A associated with the merchant to a user interface 430A associated with the transaction processing system 212, as shown in stage 406A of the user interface flow 400A. For example, the merchant website may generate a redirect request (e.g., an HTTP redirect request, a URL redirect request, etc.) that includes a network address (e.g., an HTTP address, etc.) associated with an application (e.g., a native application, a web application, etc.) associated with the transaction processing system 212. In some embodiments, the redirect request comprises a specific type of link (e.g., a universal link for the iOS® platform, a deep link for Android® platform) that is associated with the transaction processing system 212. The specific type of link may enable the operating system of the device to redirect the user to a native application (e.g., an application that is installed on the device as a standalone application instead of a web application that needs to be loaded by another application, such as a browser application, etc.) associated with the transaction processing system 212. When a browser application submits a redirect request comprising the specific type of link, the operating system of the device may automatically detect whether a native application associated with the link is installed on the device. If the native application is installed on the device, the operating system may automatically open (e.g., launch, activate, bring to the foreground of the device) the native application. On the other hand, if the operating system determines that the native application associated with the link is not installed on the device, the operating system may either redirect the user to a corresponding web application associated with the link (e.g., a web application associated with the transaction processing system 212, etc.) or prompts the user to download the native application associated with the transaction processing system 212.

The redirect request may include transaction data associated with the transaction, such as an amount associated with the transaction, descriptions of the one or more items being purchased in the transaction, etc.). In some embodiments, the redirect request may also include additional data, such as a return network address associated with the application of the merchant (e.g., the merchant website), an identifier that identifies the purchase transaction between the user and the merchant (e.g., a web session identifier, etc.), such that the application associated with the transaction processing system 212 (or another application) may redirect the user back to the user interface of the merchant after the payment transaction is completed. In some embodiments, the merchant website may also prompt the user for additional information, such as shipping information at this stage, and include the shipping information in the redirect request.

By executing the redirect request (e.g., transmitting the redirect request to the network address associated with the transaction processing system 212, etc.), the device of the user (e.g., the user device 110) may communicate with the transaction processing system 212 based on the network address included in the redirect request. The application of the transaction processing system 212 may then provide the user interface 430A on the device. Stage 406A illustrates the user interface 430A provided by the application of the transaction processing system 212 after the redirect request generated by the merchant website is executed. As shown, the user interface 430A presents a text input field for the user to provide a user identifier (e.g., an email address, a phone number, etc.) for logging into an associated PayPal account (e.g., a digital wallet of the user associated with the transaction processing system 212).

By logging into an account of the user with PayPal, the user may access a digital wallet registered with the transaction processing system 212 and may initiate a payment transaction with Merchant XYZ using the digital wallet of the user with the transaction processing system 212. Since the transaction processing system 212 may access digital wallet information of digital wallets registered with the transaction processing system 212, the transaction processing system may process the transaction using the digital wallet information, and then redirect the user back to the merchant website. On the other hand, if the user does not have a digital wallet registered with the transaction processing system 212 or if the user wishes to use a digital wallet that is registered with another transaction processing system (e.g., the transaction processing system 214, etc.), the transaction processing system 212 and/or the transaction processing system 214 may not be able to process the transaction on its own. However, using the functionalities provided by the universal transaction platform 132, the transaction processing system 212 may cooperate with the universal transaction platform 132 to facilitate the transaction between digital wallets that are registered with different transaction processing systems. For example, the application associated with the transaction processing system 212 may transmit a request (e.g., via one of the APIs 202, etc.) to inquire about all of the transaction processing systems supported by the universal transaction platform 132. The universal transaction platform 132 may provide information (e.g., names, network addresses, etc.) associated with the transaction processing systems (e.g., the transaction processing system 212, the transaction processing system 214, the transaction processing system 216, etc.) that have been onboarded with the universal transaction platform 132.

Based on the information provided by the universal transaction platform 132, the application of the transaction processing system 212 may provide enhanced features on the user interface 430A. For example, the application of the transaction processing system 212 may provide, on the user interface 430A, additional payment options that enable the user to use digital wallets that are registered with other transaction processing systems for processing the payment transaction with Merchant XYZ. As shown, the user interface 430A displays a payment option button 432A corresponding to the transaction processing system 214 (e.g., "ABC Pay") and a payment option button 434A corresponding to the transaction processing system 216 (e.g., "Acme Pay"). The payment option buttons 432A and 434A correspond to transaction processing workflow associated with the transaction processing systems 214 and 216, respectively. The selection of any one of the payment option buttons may trigger a corresponding transaction processing workflow, which enables the corresponding transaction processing system to perform the necessary processes (e.g., authentication of the user, verifying the digital wallet of the user, etc.) for completing the transaction.

If the user selects the payment option button 432A corresponding to "ABC Pay," the application of the transaction processing system 212 (e.g., "PayPal") may generate a redirect request (e.g., a HTTP redirect request, a URL redirect request, etc.) for redirecting the user of the device 110 from the user interface 430A provided by the application of transaction processing system 212 to a user interface 440A associated with transaction processing system 214 (e.g., "ABC Pay") based on the network address associated with the transaction processing system 214 and provided by the universal transaction platform 132 (since the transaction processing system 212 cannot process the transaction on its own).

In some embodiments, the universal transaction platform 132 and/or the application of the transaction processing system 212 may enable the user to interface with a native application of the transaction processing system 214 for processing the transaction with the merchant. For example, similar to the redirect request executed in the stage 404A, the redirect request used in the stage 406A may also include a specific type of link (e.g., a universal link for the iOS® platform, a deep link for Android® platform) that enables the operating system of the device to redirect the user to a native application (e.g., an application that is installed on the device as a standalone application instead of a web application that needs to be loaded by another application, such as a browser application, etc.) associated with the transaction processing system 214. For example, after receiving the user selection of the "ABC Pay" button 432A, the application of the transaction processing system 212 may submit a request to the universal transaction platform 132, indicating that the user's intent to use the transaction processing system 214 for processing the transaction. The universal transaction platform 132 may then communicate with the transaction processing system 214. Through the communication, the universal transaction platform 132 may obtain, from the transaction processing system 214, the specific type of link (e.g., the universal link, the deep link, etc.) associated with the transaction processing system 214. In some embodiments, the link that can be executed on the device depends on the computer environment associated with the device (e.g., the model of the device, an operating system of the device, etc.). As such, the universal transaction platform 132 may request a particular link from the transaction processing system 214 based on the computer environment associated with the device. Alternatively, the universal transaction platform 132 may obtain multiple links usable for different computer environments, and may select and transmit one of the link back to the application of the transaction processing system 212 executed on the device based on the computer environment associated with the device. In some embodiments, the universal transaction platform 132 may also transmit the return address to the transaction processing system 214, such that the transaction processing system 214 may instruct the application of the transaction processing system 214 executed on the device to redirect the user back to the user interface 420A of the merchant after the transaction is completed.

When a browser application (e.g., a mini-browser application within the native application associated with the transaction processing system 212, the browser application that loads the web application associated with the transaction processing system 212, etc.) submits a redirect request comprising the specific type of link, the operating system of the device may automatically detect whether a native application associated with the link is installed on the device. If the native application is installed on the device, the operating system may automatically open (e.g., launch, activate, bring to the foreground of the device) the native application. On the other hand, if the operating system determines that the native application associated with the link is not installed on the device, the operating system may either redirect the user to a corresponding web application associated with the link (e.g., a web application associated with the transaction processing system 214, etc.) or prompts the user to download the native application associated with the transaction processing system 214.

In some embodiments, the redirect request may include the transaction data associated with the transaction, digital wallet information associated with the digital wallet of the merchant that is registered with the transaction processing system 212 (e.g., an identifier associated with the transaction processing system 212, an identifier of the digital wallet of the merchant, etc.), user data associated with the user (e.g., the phone number, the email address, etc.) provided by the user via the user interface 430A, and additional data (e.g., the return network address, etc.) that enables the an application of the transaction processing system 214 to redirect the user back to the merchant website (e.g., the user interface 420A) after completing the transaction. The application of the transaction processing system 212 may execute the redirect request (e.g., transmitting the redirect request to the network address associated with the transaction processing system 214, etc.). In some embodiments, if no shipping information has been passed to the transaction processing system 212 via the redirect request generated by the merchant website, the transaction processing system 212 may prompt the user for the shipping information at this stage, and include the shipping information in the redirect request for redirecting the user to the user interface 440A of the transaction processing system 214.

Upon receiving the redirect request, the application of the transaction processing system 214 (e.g., a native application, a web application, etc.) may generate and present the user interface 440A on the device, and may perform the transaction processing workflow via the user interface 440A. Stage 408A of the user interface flow 400A illustrates the user interface 440A after the user has selected the payment option button 432A corresponding to the transaction processing system 214. As shown, the user interface 440A presents text input fields that allow the user to provide credentials (e.g., an email address, a password, etc.) for logging into an account (e.g., a digital wallet, etc.) of the user with the transaction processing system 214.

Based on the credentials provided by the user, the application of the transaction processing system 214 may authenticate the user and access the digital wallet information associated with the digital wallet of the user registered with the transaction processing system 214 for use in the transaction. The transaction processing system 214 may also verify the digital wallet of the user and determine whether the transaction is fraudulent based on the transaction data and information associated with the digital wallet. For example, the transaction processing system 214 may use one or more computer programs to determine a likelihood that the transaction is fraudulent based on the transaction data and the digital wallet information associated with the digital wallet of the user. In some embodiments, the transaction processing system 214 may use the universal transaction platform 132 to also verify the digital wallet of the merchant using the techniques disclosed herein. For example, the transaction processing system 214 may instruct the universal transaction platform 132 to execute the one or more computer programs based on digital wallet information associated with the digital wallet of the merchant.

In stage 410A of the user interface flow 400A, the application of the transaction processing system 214 presents, on the interface 440A, the digital wallet information associated with the digital wallet (e.g., information of one or more payment sources stored within the digital wallet of the user, a balance of the digital wallet, etc.) and transaction data associated with the transaction. As shown, the user interface 440A in the stage 410A shows a balance of the digital wallet of the user registered with the transaction processing system 214. The user interface 440A also shows shipping details and delivery options for the purchase transaction, and a total amount to be charged from the digital wallet of the user for the purchase transaction. Depending on how the transaction information was stored, the application of the transaction processing system 214 may obtain the transaction information from the universal transaction platform 132, the transaction processing system 212, or extracted from the redirect request generated by the application of the transaction processing system 212. As discussed herein, different transaction processing systems may correspond to different geographical areas. In this example, since the transaction processing system 214 corresponds to the China region, the total amount and account balance is shown on the user interface 440A in a Chinese currency (instead of the currency shown on the merchant website in stages 402A and 404A of the user interface flow 400A). The user may confirm the purchase transaction by selecting the 'Pay' button on the user interface 440A in the stage 410A.

After the user confirms the purchase transaction, the application of the transaction processing system 214 may transmit a transaction processing request (e.g., via a push API call, etc.) to the universal transaction platform 132. The application of the transaction processing system 214 may include digital wallet information associated with the digital wallet of the merchant registered with the transaction processing system 212, digital wallet information associated with the digital wallet of the user registered with the transaction processing system 214, and the transaction data associated with the transaction in the transaction processing request (e.g., as parameters in the push API call, etc.). The universal transaction platform 132 may process the transaction based on the information included in the transaction processing request. In some embodiments, the universal transaction platform 132 may communicate with the transaction processing system 212 and/or the transaction processing system 214 to complete the transaction. For example, the universal transaction platform 132 may use the settlement module 208 to process the payment transaction by transferring funds from the digital wallet of the user to the digital wallet of the merchant, using the techniques disclosed herein. In some embodiments, the universal transaction platform 132 may record the purchase transaction in the transaction ledger of the data store 210 (e.g., a blockchain, etc.), and may perform a batch settlement process subsequently. After completing the transaction, the universal transaction platform 132 may transmit a transaction success signal to the application of the transaction processing system 214 (e.g., as a response to the push API call, etc.).

Upon receiving the transaction success signal, the application of the transaction processing system 214 may generate a redirect request for redirecting the user of the device from the user interface 440A associated with the transaction processing system 214 back to the user interface 420A of the merchant (e.g., Merchant XYZ). The redirect request may include the transaction success signal, and an identifier associated with the transaction (e.g., the web session identifier that has been relayed to the application of the transaction processing system 214 via the transaction processing system 212, etc.). Stage 412A illustrates the user interface 420A provided by the merchant website after the user is redirected from the user interface 440A of the transaction processing system 214 after the transaction is completed. As shown, the user interface 420A indicates to the user that the purchase transaction has been completed.

One of the technical advantages of using the computer framework as disclosed herein to facilitate transactions between digital wallets that are registered with different transaction processing systems, according to various embodiments of the disclosure, is that no modification or integration of any computer components of the participants involved in the transaction (e.g., the merchant website of the merchant, the browser application of the user, the digital wallet application of the user, etc.) is required. As illustrated in the user interface flow 400A, the entire processing of the transaction between the digital wallet of the merchant and the digital wallet of the user is transparent and seamless to the merchant website of Merchant XYZ. The merchant website performs the same steps as if the transaction is conducted between digital wallets that are both registered with the same transaction processing system 212, and by the transaction processing system 212. Specifically, the merchant website is unaware of the involvement of the transaction processing system 214 and the universal transaction platform in the processing of the transaction. The merchant website executes the redirect request to redirect the user to the user interface 430A of the transaction processing system 212 (in the stage 404A of the user interface flow 400A), and subsequently receives a redirect request after the transaction is completed (in the stage 412A of the user interface flow 400A), in the same way when the transaction is entirely processed by the transaction processing system 212. Such a system enables quick and efficient deployment of the computer framework to different users of transaction processing systems.

Figure 4B:
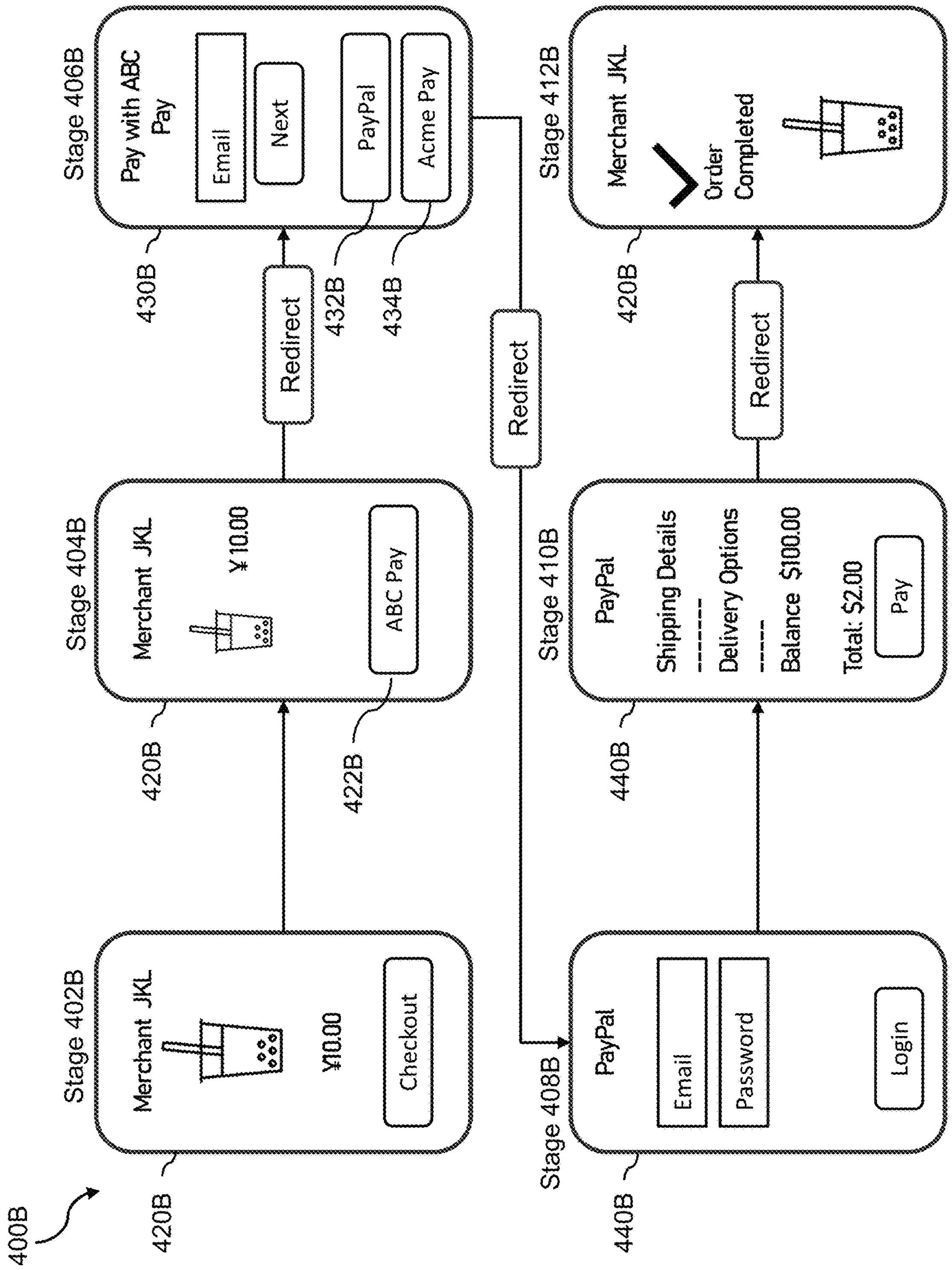
FIG. 4B illustrates another example user interface flow for conducting a transaction using the universal transaction platform according to an embodiment of the present disclosure.

FIG. 4B illustrates an example user interface flow 400B for conducting a transaction according to an embodiment of the disclosure. In the example illustrated in the user interface flow 400B, a user (e.g., the user 140) having a digital wallet that is registered with a first transaction processing system (e.g., the transaction processing system 212) is purchasing items from an online merchant (e.g., Merchant JLK) having a digital wallet that is registered with a second transaction processing system (e.g., the transaction processing system 214). For example, the user may use a browser application (e.g., the UI application 112 of the user device 110) to browse a merchant website (e.g., the website of Merchant JKL, etc.). The user may select one or more items for purchase by interacting with the merchant website. In this example, the user has selected a boba milk tea. Stage 420B of the user interface flow 400B illustrates a user interface 420B of the merchant after the user 140 has navigated to a checkout page of the merchant website. As shown in the stage 402B, the merchant website presents, on the user interface 420B, descriptions of the item selected for purchase (e.g., the boba milk tea), a price of the item, and a 'checkout' button. Since Merchant JLK (and/or the user 140) is located in China, the merchant website may present the price of the item in a Chinese currency on the user interface 420B.

The user interface flow 400B is substantially similar to the user interface flow 400A. For example, after the user selects the 'checkout' button presented on the user interface 420B in the stage 402B, the merchant website may present a summary of the purchase, and provides one or more payment options for processing the transaction, as illustrated in stage 404B of the user interface flow 400B. In this example, since Merchant JKL uses the digital wallet registered with the transaction processing system 214 (e.g., ABC Pay) for conducting transactions with different consumers, the transaction processing system 214 may provide payment processing functionalities via the user interface of the merchant. In some embodiments, the transaction processing system 214 may provide an application (e.g., a software development kit (SDK), etc.) that can be integrated within the application of the merchant (e.g., integrated within the website). The integration of the SDK within the merchant website enables the merchant website to present one or more payment options associated with the transaction processing system 214 on the user interface. In this example, as shown in stage 404B of the user interface flow 400B, the SDK enables the merchant website to present, on the user interface 420B, a payment button 422B which indicates a name of the transaction processing system 214 (e.g., "ABC Pay"). A selection of the payment button 422B may trigger a payment flow provided by the transaction processing system 214.

If the user selects the payment button 422B, the merchant website, via the SDK integrated within the merchant website, may redirect the user from the user interface 420B associated with the merchant to a user interface 430B associated with the transaction processing system 214, as shown in stage 406B of the user interface flow 400B. Stage 406B illustrates the user interface 430B provided by the application of the transaction processing system 214 after the redirect request generated by the merchant website is executed. As shown, the user interface 430B presents a text input field for the user to provide a user identifier (e.g., an email address, a phone number, etc.) for logging into an associated ABC Pay account (e.g., a digital wallet of the user associated with the transaction processing system 212).

Since the transaction processing system 214 has also been onboarded with the universal transaction platform 132, the transaction processing system 214 may use the functionalities provided by the universal transaction platform 132 to provide enhanced features to the user. For example, based on information obtained from the universal transaction platform 132, the application of the transaction processing system 214 may enable the user 140 to conduct the transaction with the merchant using a digital wallet that is registered with a transaction processing system (e.g., the transaction processing system 212, the transaction processing system 216, etc.) different from the one associated with the digital wallet of Merchant JKL. As shown in the stage 406B of the user interface flow 400B, the application of the transaction processing system 214 may provide, on the user interface 430B, additional payment options that enable the user to use digital wallets that are registered with other transaction processing systems for processing the payment transaction with Merchant XYZ. In this example, the user interface 430B displays a payment button 432B corresponding to the transaction processing system 212 (e.g., "PayPal") and a payment option button 434B corresponding to the transaction processing system 216 (e.g., "Acme Pay"). The payment buttons 432B and 434B correspond to transaction processing workflow associated with the transaction processing systems 212 and 216, respectively. The selection of any one of the payment buttons may trigger a corresponding transaction processing workflow, which enable the corresponding transaction processing system to perform the necessary processes (e.g., authentication of the user, verifying the digital wallet of the user, etc.) for completing the transaction. If the user selects the payment button 432B, the application of the transaction processing system 214 may redirect the user from the user interface 430B of the transaction processing system 214 to a user interface 440B of the transaction processing system 212 using the techniques disclosed herein.

Stage 408B of the user interface flow 400B illustrates the user interface 440B after the user has selected the payment button 432B corresponding to the transaction processing system 212. As shown, the user interface 440B presents text input fields that enable the user to provide credentials (e.g., an email address, a password, etc.) for logging into an account (e.g., a digital wallet, etc.) of the user with the transaction processing system 212. The application of the transaction processing system 212 may perform the necessary processes (e.g., authenticating the user, verifying the digital wallet of the user, etc.) via the user interface 440B and communicating with the universal transaction platform 132. In some embodiments, the transaction processing system 212 may also use the universal transaction platform 132 to verify the digital wallet of the merchant using the techniques disclosed herein.

In stage 410B of the user interface flow 400B, the application of the transaction processing system 212 presents, on the user interface 440B, the digital wallet information associated with the digital wallet of the user, and a summary of the transaction. After the user confirms the transaction via the user interface 440B, the application of the transaction processing system 212 transmits a transaction request (e.g., a push API call, etc.) to the universal transaction platform 132. After receiving a confirmation from the universal transaction platform 132 that the transaction is complete, the application of the transaction processing system 212 redirects the user back to the user interface 420B of the merchant website, which indicates that the transaction is complete, as shown in stage 412B of the user interface flow 400B.

Figure 5:
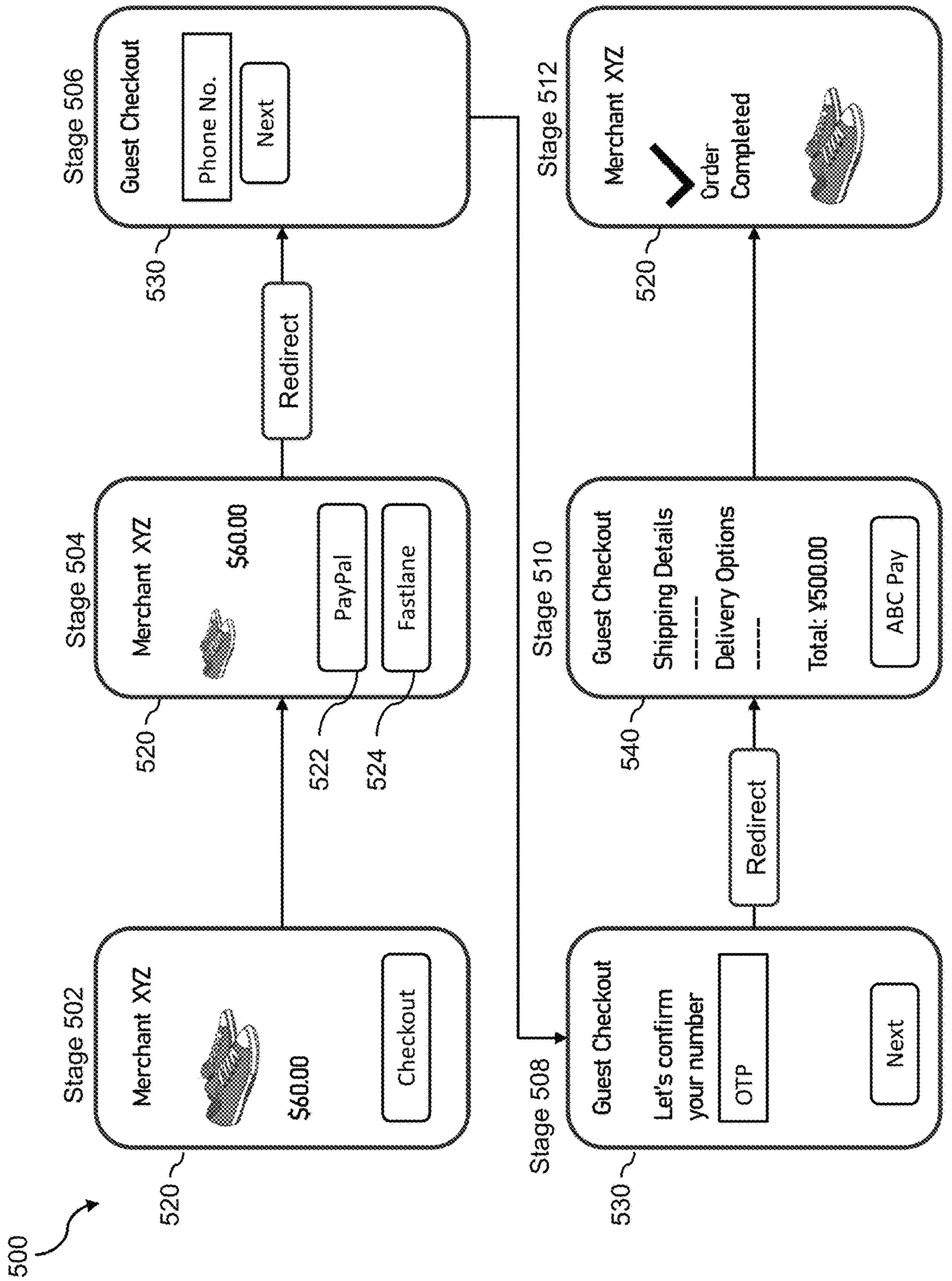
FIG. 5 illustrates another example user interface flow for conducting a transaction using the universal transaction platform according to an embodiment of the present disclosure.

FIG. 5 illustrates another example user interface flow 500 for conducting a transaction according to an embodiment of the disclosure. Similar to the user interface flow 400A in FIG. 4A, a user (e.g., the user 140, etc.) in the example illustrated in the user interface flow 500 is purchasing one or more items from a merchant (e.g., Merchant XYZ) via a user interface 520 provided by the merchant (e.g., a merchant website associated with Merchant XYZ, etc.). For example, the user may use a browser application (e.g., the UI application 112 of the user device 110) to browse the merchant website. The user may select one or more items for purchase by interacting with the merchant website. In this example, the user has selected a pair of shoes. The user may then navigate to the checkout page of the merchant website, as shown in stage 502, where the item selected for purchase (e.g., the pair of shoes), a price of the item, and a 'checkout' button are presented on a user interface 520 of a user device.

Stage 504 illustrates the user interface 520 after the user has selected the 'checkout' button. As shown, the user interface 520 in the stage 504 presents a summary of the purchase, and provides different options for paying for the item. Since the merchant has a digital wallet that is registered with the transaction processing system 212 (e.g., PayPal), and uses the transaction processing system 212 for processing transactions between Merchant XYZ and its consumers, the transaction processing system 212 may provide computer programming code (e.g., a SDK, etc.) to be integrated within the merchant website. The SDK may enable the merchant website to initiate a payment process flow associated with the transaction processing system 212. For example, based on the integration of the SDK into the merchant website, the merchant website may present, on the user interface 520, a payment option button 522 corresponding to the transaction processing system 212, as illustrated in the stage 504 of the user interface flow 500.

In some embodiments, the SDK also enables the merchant website to present a second payment option button 524, corresponding to a "Fastlane" checkout process. The "Fastlane" checkout process is an expedited checkout process, which enables the user to only provide identifying information (e.g., a phone number, an email address, etc.) to access a digital wallet of the user for use in the transaction. For example, after receiving the identifying information, the transaction processing system 212 may generate a one-time code (e.g., a random value, etc.), and may transmit the one-time code to a device associated with the identifying information (e.g., a trusted device associated with the phone number, a device with access to an email account associated with the email address, etc.). The transaction processing system 212 may then authenticate the user by prompting the user for the one-time code via a user interface (e.g., the user interface 530, etc.).

If the user selects the payment option button 524, the merchant website, using the SDK integrated within the merchant website, may redirect the user from the user interface 520 associated with the merchant website to a user interface 530 associated with the transaction processing system 212 (e.g., via a redirect request) using the techniques disclosed herein, as shown in stage 506 of the user interface flow 500. As shown in the stage 506 of the user interface flow 500, an application associated with the transaction processing system 212 presents, on the user interface 530, a text input field that enables the user to input identifying information (e.g., a phone number, an email address, etc.). After receiving the identifying information, the transaction processing system 212 may identify a digital wallet of the user based on the identifying information, and may transmit a one-time code to a device of the user (e.g., the user device 110 or another device of the user, etc.) based on the identifying information. The application of the transaction processing system 212 may then prompt, via the user interface 530, for the one-time code to authenticate the user for accessing the digital wallet of the user, as illustrated in stage 508 of the user interface flow 500.

In some embodiments, the transaction processing system 212 accesses digital wallet information associated with digital wallets that are registered with the transaction processing system 212 and stored in a data storage accessible by the transaction processing system 212. If the user has a digital wallet that is registered with the transaction processing system 212, the transaction processing system may identify the digital wallet of the user and access the digital wallet information of the digital wallet from the data storage. However, the user may not have a digital wallet that is registered with the transaction processing system 212. Instead, the user may have a digital wallet that is registered with another transaction processing system (e.g., the transaction processing system 214, etc.).

As discussed herein, due to the onboarding of the transaction processing system 212 with the universal transaction platform 132, the transaction processing system 212 may support the processing of transactions with digital wallets that are not registered with the transaction processing system 212. As such, the "Fastlane" checkout process may be provided to process transactions with users having digital wallets that are registered with any transaction processing systems that are supported by the universal transaction platform 132 (not limited to the transaction processing system 212) to initiate a transaction with the merchant.

When the transaction processing system 212 fails to identify a digital wallet that is registered with the transaction processing system 212 based on the identifying information, instead of rejecting the transaction as being unsupported (since the transaction processing system 212 on its own cannot process the transaction), the transaction processing system 212 may work with the universal transaction platform 132 to process the transaction. For example, the transaction processing system 212 may transmit a discovery request (e.g., via a discovery API, etc.) to the universal transaction platform 132. The discovery module 206 may process the discover request using the techniques disclosed herein and provide a response to the transaction processing system 212. Based on the response from the discovery request, the transaction processing system 212 may determine a digital wallet of the user and the particular transaction processing system (e.g., the transaction processing system 214, etc.) with which the digital wallet is associated.

In some embodiments, based on the response from the discovery request, the application of the transaction processing system 212 may redirect the user from the user interface 530 of the transaction processing system 212 to a user interface of the transaction processing system 214 (e.g., a user interface 540, etc.) via a redirect request using the techniques disclosed herein. The redirect request may include the identifying information provided by the user, transaction data associated with the transaction, and a network address associated with the merchant website, such that an application of the transaction processing system 214 may subsequently redirect the user back to the user interface 520 of the merchant website after completing the transaction. In some embodiments, the authentication of the user (e.g., using the one-time code, etc.) may be performed by the transaction processing system 214 after the user is redirected to the user interface 540 of the transaction processing system 214. Thus, the redirection may occur after the stage 506 of the user interface flow 500, and the user interface 540 of the transaction processing system 214, instead of the user interface 530 of the transaction processing system 212, may be presented on the device in the stage 508 for prompting the user for the one-time code.

After the user is authenticated, the application of the transaction processing system 214 may present, on the user interface 540, the digital wallet information associated with the digital wallet of the user, and a summary of the transaction, as illustrated in stage 510 of the user interface flow 500. After the user confirms the transaction via the user interface 540, the application of the transaction processing system 214 transmits a transaction request (e.g., a push API call, etc.) to the universal transaction platform 132. After receiving a confirmation from the universal transaction platform 132 that the transaction is complete, the application of the transaction processing system 214 redirects the user back to the user interface 520 of the merchant website, which indicates that the transaction is complete, as shown in stage 512 of the user interface flow 500.

Figure 6A:
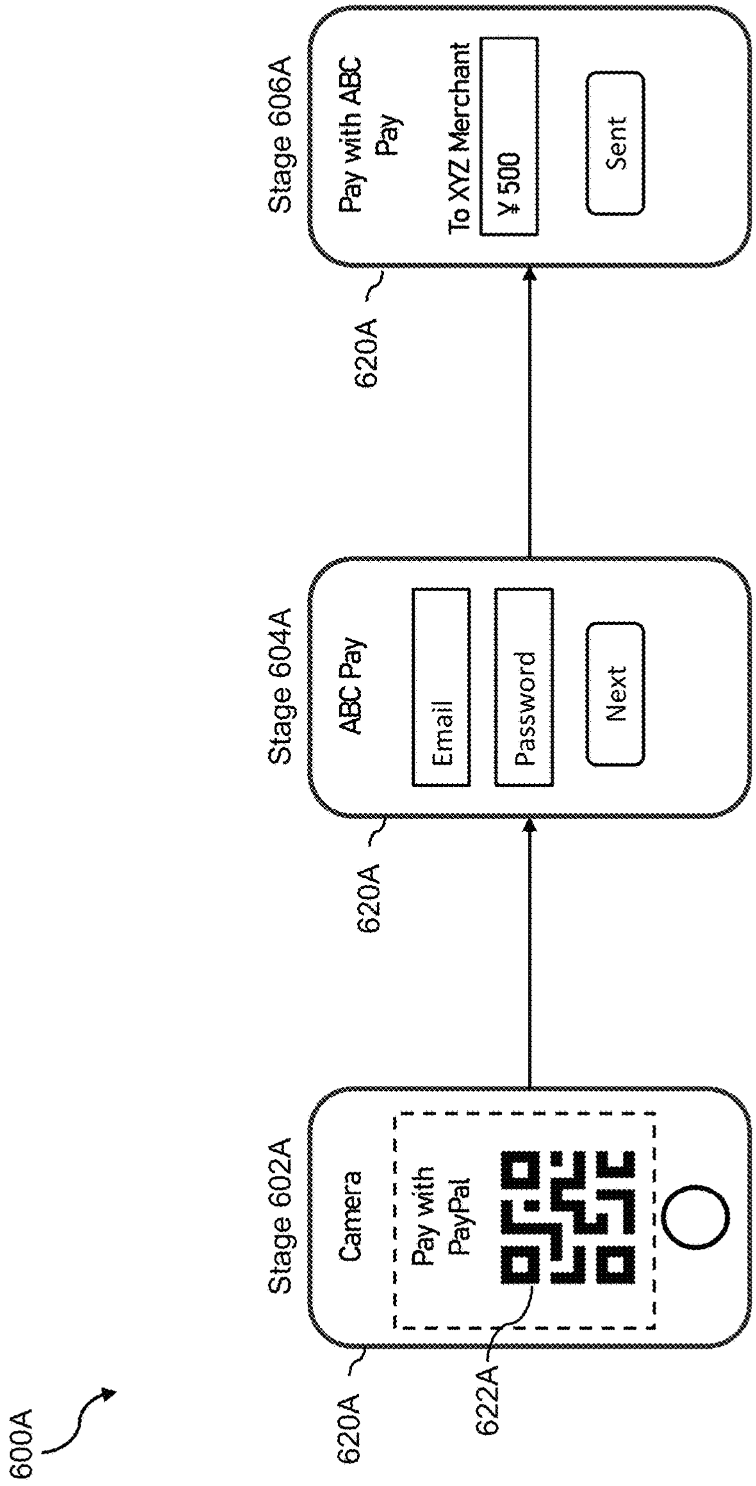
FIG. 6A illustrates another example user interface flow for conducting a transaction using the universal transaction platform according to an embodiment of the present disclosure.

FIG. 6A illustrates another example user interface flow 600A for conducting a transaction according to an embodiment of the disclosure. In the example illustrated in the user interface flow 600A, a user (e.g., the user 140) initiates a purchase transaction for purchasing one or more items from a merchant (e.g., XYZ Merchant) at a physical store of the merchant. The merchant in this example has a digital wallet registered with the transaction processing system 212 (e.g., PayPal, etc.). As such, the transaction processing system 212 may provide mechanisms for processing transactions conducted between the merchant and its consumers. In this example, the transaction processing system 212 provides a code (e.g., a bar code, a QR code, a sequence of values, etc.) that represents the digital wallet of the merchant. The code can be presented at a point-of-sale location at the physical store of the merchant (e.g., affixed at a checkout location, etc.). The user may use a payment application (e.g., wallet application 116, etc.) to identify the digital wallet of the merchant based on the code (e.g., by scanning the code, etc.), and initiate a purchase transaction through the payment application.

In stage 602A, the user uses the payment application to capture an image of a code 622A associated with the merchant. The payment application may transmit the code to the transaction processing system 214. If the payment application is associated with the transaction processing system 212, indicating that the user also has a digital wallet registered with the transaction processing system 212, the payment application and the transaction processing system 212 may identify the digital wallet of the merchant based on the code, and process the transaction with the merchant internally. However, if the payment application is associated with another transaction processing system (e.g., the transaction processing system 214), the payment application and the transaction processing system 214 may not be able to process the transaction, since the payment application and the transaction processing system 214 cannot identify a digital wallet based on the code and do not have information associated with the digital wallet for processing the transaction.

As such, the payment application may transmit a discovery request (e.g., making a discovery API call, etc.) to the universal transaction platform 132 based on the code (e.g., including the code as a parameter of the API call, etc.). Based on the code, the discovery module 206 of the universal transaction platform 132 may identify a digital wallet of the merchant and a particular transaction processing system (e.g., the transaction processing system 212, etc.) associated with the digital wallet, and provide a response to the payment application. The response may include the digital wallet information of the digital wallet of the merchant (e.g., a name of the merchant, a currency used, a location of the merchant, etc.) and information associated with the transaction processing system 212 (e.g., a name of the transaction processing system, etc.).

The payment application may proceed with authenticating the user for accessing a digital wallet of the user that is registered with the transaction processing system 214. For example, the payment application may prompt the user, via the user interface 620A, to enter credential information (e.g., a user name, a password, etc.) associated with the digital wallet of the user, as shown in stage 604A of the user interface flow 600A.

After authenticating the user, the payment application may present, on the user interface 620A, information associated with the merchant, such as the name of the merchant, a location of the merchant, the name of the transaction processing system 212 associated with the merchant etc., as shown in stage 606A of the user interface flow 600A. The payment application may also prompt the user for a payment amount for paying the merchant. For example, the payment application may provide a text input field on the user interface 620A, as illustrated in the stage 606A. As discussed herein, different transaction processing systems may correspond to different geographical areas. In this example, since the transaction processing system 214 associated with the user corresponds to the China region, the payment application enables the user to enter the payment amount in a Chinese currency, regardless of the currency being used by the merchant and the transaction processing system 212. After receiving a confirmation for processing the transaction from the user, the payment application may initiate the process of the transaction by transmitting a transaction request (e.g., a push API call) to the universal transaction platform 132.

Figure 6B:
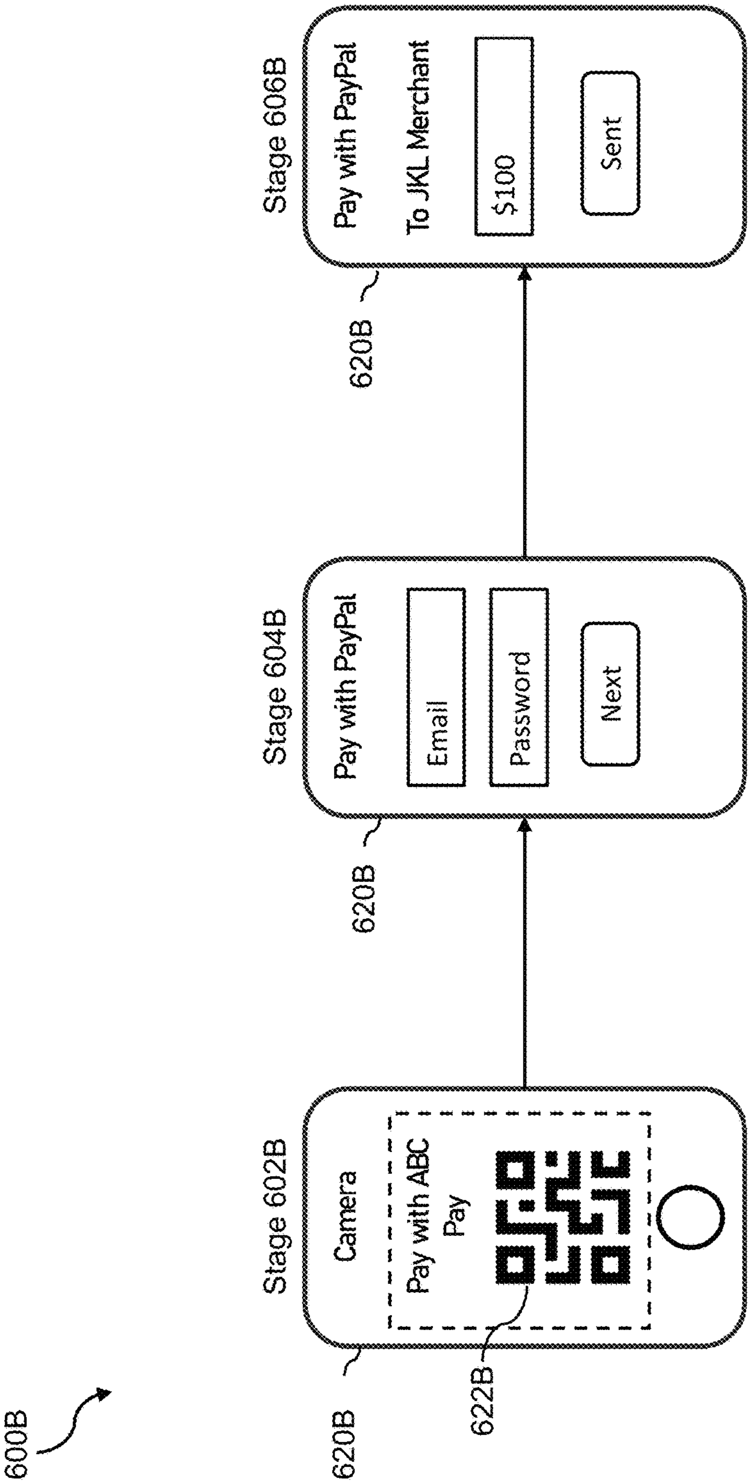
FIG. 6B illustrates another example user interface flow for conducting a transaction using the universal transaction platform according to an embodiment of the present disclosure.

FIG. 6B illustrates another example user interface flow 600B for conducting a transaction according to an embodiment of the disclosure. The user interface flow 600B is substantially similar to the user interface flow 600A of FIG. 6A, except that the merchant in the example illustrated in the user interface flow 600B has a digital wallet registered with the transaction processing system 214 (instead of the transaction processing system 212), and the user who is purchasing one or more items from the merchant has a digital wallet registered with the transaction processing system 212 (instead of the transaction processing system 214). As shown in stage 602B, the merchant has provided a code 622B at a point-of-sale location of a physical store of the merchant. The merchant may also indicate that the code is associated with a digital wallet associated with the transaction processing system 214 (e.g., ABC Pay).

The user may use a payment application that is associated with the transaction processing system 212 (e.g., PayPal) to initiate a transaction with the merchant based on the code. For example, the user may use the payment application to scan the code 622B. The payment application may transmit the code 622B to the transaction processing system 212. The transaction processing system 212 may attempt to identify a digital wallet associated with the merchant based on digital wallet information accessible by the transaction processing system 212. However, since the digital wallet of the merchant is registered with the transaction processing system 214, the transaction processing system 212 may not have access to the digital wallet information of the digital wallet of the merchant. As such, the payment application and/or the transaction processing system 212 may transmit a discovery request (e.g., a discovery API call, etc.) to the universal transaction platform 132. Based on the code, the discovery module 206 of the universal transaction platform 132 may identify a digital wallet of the merchant and a particular transaction processing system (e.g., the transaction processing system 214, etc.) associated with the digital wallet, and provide a response to the payment application. The response may include the digital wallet information of the digital wallet of the merchant (e.g., a name of the merchant, a currency used, a location of the merchant, etc.) and information associated with the transaction processing system 214 (e.g., a name of the transaction processing system, etc.).

The payment application may proceed with authenticating the user for accessing a digital wallet of the user that is registered with the transaction processing system 214. For example, the payment application may prompt the user, via the user interface 620B, to enter credential information (e.g., a user name, a password, etc.) associated with the digital wallet of the user, as shown in stage 604B of the user interface flow 600B.

After authenticating the user, the payment application may present, on the user interface 620A, information associated with the merchant, such as the name of the merchant, a location of the merchant, the name of the transaction processing system 214 associated with the merchant etc., as shown in stage 606B of the user interface flow 600B. The payment application may also prompt the user for a payment amount for paying the merchant. For example, the payment application may provide a text input field on the user interface 620B, as illustrated in the stage 606B. As discussed herein, different transaction processing systems may correspond to different geographical areas. In this example, since the transaction processing system 212 associated with the user corresponds to the United States region, the payment application enables the user to enter the payment amount in the U.S. Dollars, regardless of the currency being used by the merchant and the transaction processing system 214. After receiving a confirmation for processing the transaction from the user, the payment application may initiate the process of the transaction by transmitting a transaction request (e.g., a push API call) to the universal transaction platform 132.

Figure 7A:
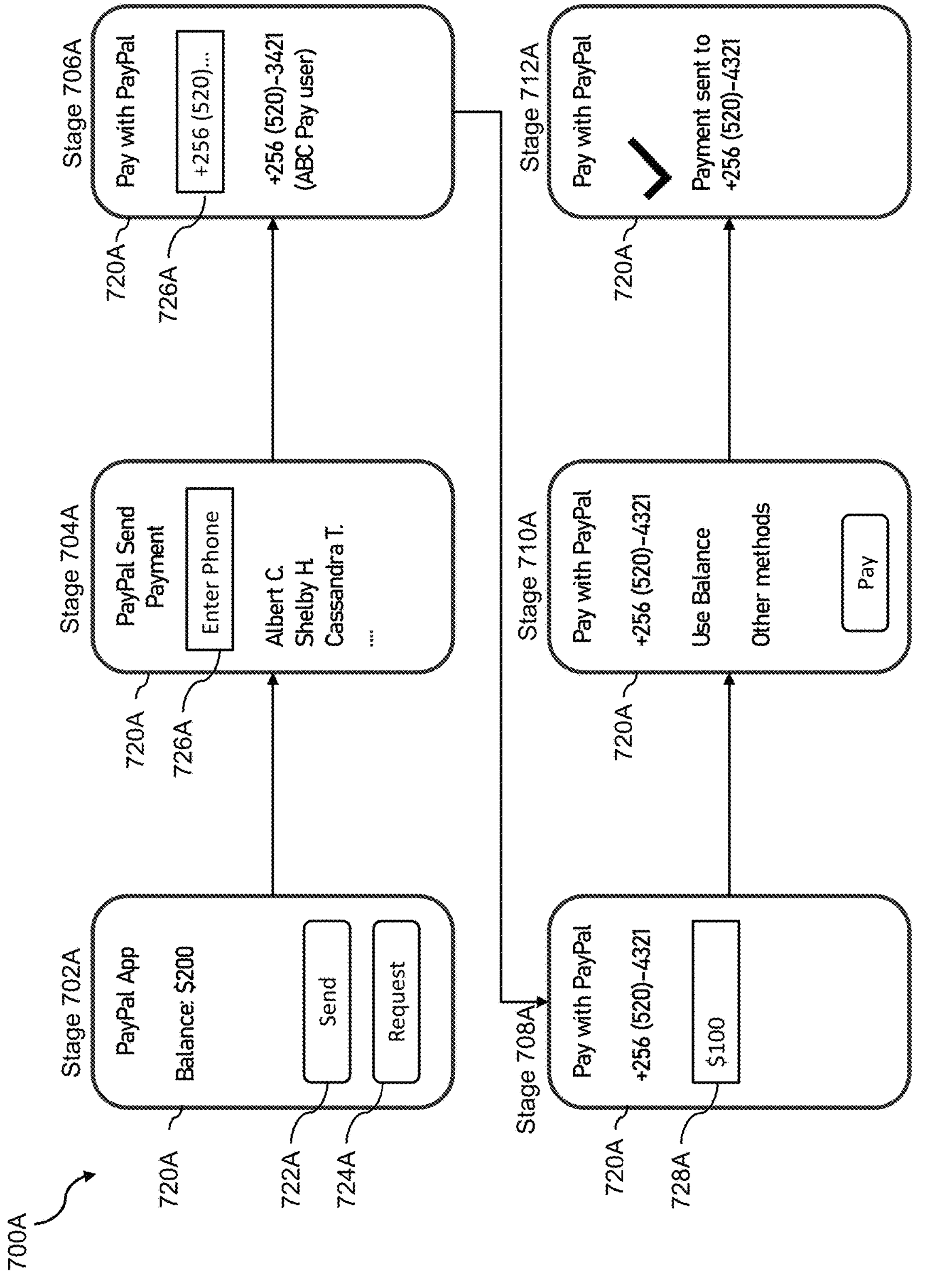
FIG. 7A illustrates another example user interface flow for conducting a transaction using the universal transaction platform according to an embodiment of the present disclosure.

FIG. 7A illustrates another example user interface flow 700A for conducting a transaction according to an embodiment of the disclosure. In the example illustrated in the user interface flow 700A, a first user (e.g., the user 140) who has a digital wallet associated with a first transaction processing system (e.g., the transaction processing system 212 which may correspond to PayPal) is performing a peer-to-peer funds transfer transaction with a second user (e.g., the user of the user device 180) who has a digital wallet associated with a second transaction processing system (e.g., the transaction processing system 214 which corresponds to ABC Pay). In this example, the first user may initiate the peer-to-peer funds transfer transaction using a wallet application associated with the transaction processing system 212 (e.g., the wallet application 116), which enables the first user to access the digital wallet of the first user registered with the transaction processing system 212.

Stage 702A illustrates a user interface 720A provided by the wallet application when the user logs into a digital wallet of the first user with the transaction processing system 212. As shown, the wallet application presents, on the user interface 720A, an account balance of the digital wallet. The wallet application may also present, on the user interface 720A, a 'send' button 722A for requesting to send funds to another user and a 'request' button 724A for requesting to receive funds from another user.

Stage 704A illustrates the user interface 720A after the first user has selected the 'send' button 722A. As shown, the wallet application prompts the first user to identify a recipient of the funds transfer transaction via the user interface 720A. For example, the wallet application may provide, on the user interface 720A, a text input field 726A that allows the first user to enter identifying information (e.g., a phone number, an email address, etc.) associated with the recipient, as shown in the stage 704A. In some embodiments, the wallet application also retrieves a list of contacts stored on the device of the first user (e.g., the user device 110, etc.), and present the list on the user interface 720A. As such, instead of manually entering the identifying information of the recipient, the first user may also choose a contact from the list as the recipient of the transaction.

Alternatively, the wallet application may also activate a near-field communication (NFC) component of the user device 110, which allows the user to identify the recipient of the funds transfer transaction by tapping the user device 110 against another NFC-enabled device (e.g., the user device 180). The tapping action may trigger the wallet application 116 to establish a peer-to-peer communication between the user device 110 and the user device 180. The wallet application 116 may then retrieve information (e.g., an identity associated with the user of the user device 180, such as a phone number, an email address, etc.) from the user device 180 via the peer-to-peer communication. Details of the mechanism that enables the NFC communication and exchange of information, according to various embodiments, can be found in U.S. patent application Ser. No. 19/049,401 titled "Proximity Tokenized Data Transmission for Interoperable Device Platforms," filed Feb. 10, 2025, which is incorporated herein by reference in its entirety. The mechanism that enables the processing of transactions between digital wallets via NFC communications between devices will be described in more detail below by reference to FIGS. 8 and 9.

Referring back to FIG. 7A, in this example, the first user enters a phone number (e.g., +250(520)-4321) associated with a recipient (e.g., a second user, who may be the user of the user device 180, etc.) into the text input field 726A of the user interface 720A, as illustrated in stage 706A of the user interface flow 700A. After receiving the identifying information of the recipient, the wallet application may determine whether the second user has a digital wallet that is registered with the transaction processing system 212 by communicating with the transaction processing system 212. If it is determined that the second user does not have a digital wallet associated with the transaction processing system 212 based on the identifying information, the wallet application and/or the transaction processing system 212 may use the universal transaction platform 132 to continue processing the transaction. For example, the wallet application and/or the transaction processing system may transmit a discovery request (e.g., the discovery API call, etc.) to the universal transaction platform 132 based on the identifying information of the second user. In some embodiments, the wallet application may use a software development kit (SDK 226) provided by the universal transaction platform 132 to make the discovery request. The discovery module 206 of the universal transaction platform 132 may determine a digital wallet of the second user, and may provide a response to the wallet application and/or the transaction processing system 212 using the techniques disclosed herein. The response may include information associated with the second user (e.g., a name of the second user, a location of the second user, etc.) and digital wallet information of the digital wallet of the second user (e.g., a name of the transaction processing system 214 associated with the digital wallet, a currency associated with the digital wallet, etc.).

Based on the response provided by the discovery module 206, the wallet application may present, on the user interface 720A, the information of the second user and the digital wallet information of the digital wallet of the second user (e.g., the name of the second user, the name of the transaction processing system 214 (ABC Pay), etc.), as shown in stages 706A and 708A of the user interface flow 700A. The wallet application may also provide, on the user interface 720A, a text input field 728A that allows the first user to enter a transaction amount associated with the transaction.

At stage 710A, the wallet application prompts the first user to select a funding source to be used to fund the transaction. After the first user selects the funding source for the transaction, the wallet application may initiate the transaction using the universal transaction platform 132. For example, the wallet application may initiate the funds transfer transaction by transmitting a transaction request (e.g., a push API call, etc.) to the universal transaction platform 132 to request funds to be transferred from the digital wallet of the first user registered with the transaction processing system 212 to the digital wallet of the second user registered with the transaction processing system 214. It is noted that if the first user selects to request funds from the second user (instead of sending funds to the second user), the wallet application may transmit a pull API call to the universal transaction platform 132 instead). The transaction request may include the identity of the sender (e.g., the first user), funding account information of the sender, the identity of the recipient (e.g., the second user), funding account information of the recipient, the transfer amount, etc. Using the information included in the transaction request, the universal transaction platform 132 may process the funds transfer transaction using the techniques disclosed herein. The universal transaction platform 132 may transmit an indication of the transaction being completed back to the wallet application. The wallet application 116 may then indicate to the user that the transaction has been completed via the user interface 720A based on the indication received from the universal transaction platform 132, as shown in stage 712A of the user interface flow 700A.

Figure 7B:
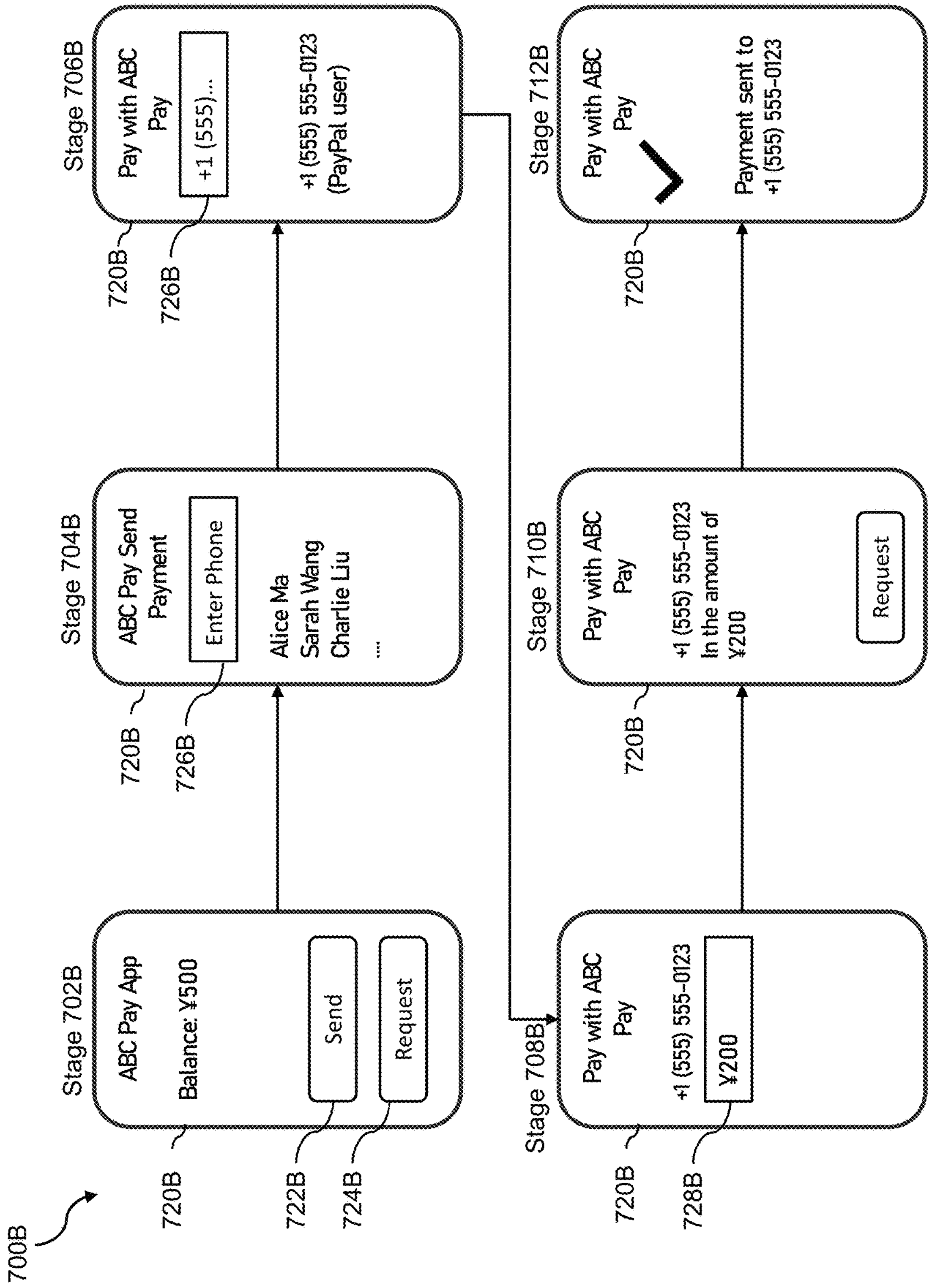
FIG. 7B illustrates another example user interface flow for conducting a transaction using the universal transaction platform according to an embodiment of the present disclosure.

FIG. 7B illustrates another example user interface flow 700A for conducting a transaction according to an embodiment of the disclosure. The user interface flow 700B is substantially similar to the user interface flow 700A in FIG. 7A, except that the first user (e.g., the user 140 of the user device 110, etc.) having a digital wallet that is registered with the transaction processing system 214 (e.g., ABC Pay) is requesting funds from the second user (e.g., the user of the user device 180, etc.) having a digital wallet that is registered with the transaction processing system 212 (e.g., PayPal).

In this example, the first user may initiate the peer-to-peer funds transfer transaction using a wallet application associated with the transaction processing system 214 (e.g., the wallet application 116), which enables the first user to access the digital wallet of the first user registered with the transaction processing system 214. Stage 702B illustrates a user interface 720B provided by the wallet application when the user logs into a digital wallet of the first user with the transaction processing system 214. As shown, the wallet application presents, on the user interface 720B, an account balance of the digital wallet. The wallet application may also present, on the user interface 720B, a 'send' button 722B for requesting to send funds to another user and a 'request' button 724B for requesting to receive funds from another user.

Stage 704B illustrates the user interface 720B after the first user has selected the 'request' button 724B. As shown, the wallet application prompts the first user to identify a sender of the funds transfer transaction via the user interface 720B. For example, the wallet application may provide, on the user interface 720B, a text input field 726B that allows the first user to enter identifying information (e.g., a phone number, an email address, etc.) associated with the sender, as shown in the stage 704B. In some embodiments, the wallet application also retrieves a list of contacts stored on the device of the first user (e.g., the user device 110, etc.), and present the list on the user interface 720B. As such, instead of manually entering the identifying information of the sender, the first user may also choose a contact from the list as the sender of the transaction. Alternatively, the wallet application may also activate a near-field communication (NFC) component of the user device 110, which allows the user to identify the sender of the funds transfer transaction by tapping the user device 110 against another NFC-enabled device (e.g., the user device 180).

In this example, the first user enters a phone number (e.g., +555-555-0123) associated with the sender (e.g., a second user, who may be the user of the user device 180, etc.) into the text input field 726B of the user interface 720B, as illustrated in stage 706B of the user interface flow 700B. After receiving the identifying information of the sender, the wallet application may determine whether the second user has a digital wallet that is registered with the transaction processing system 214 by communicating with the transaction processing system 214. If it is determined that the second user does not have a digital wallet associated with the transaction processing system 214 based on the identifying information, the wallet application and/or the transaction processing system 214 may use the universal transaction platform 132 to continue processing the transaction. For example, the wallet application and/or the transaction processing system may transmit a discovery request (e.g., the discovery API call, etc.) to the universal transaction platform 132 based on the identifying information of the second user. In some embodiments, the wallet application may use a software development kit (SDK 226) provided by the universal transaction platform 132 to make the discovery request. The discovery module 206 of the universal transaction platform 132 may determine a digital wallet of the second user, and may provide a response to the wallet application and/or the transaction processing system 212 using the techniques disclosed herein. The response may include information associated with the second user (e.g., a name of the second user, a location of the second user, etc.) and digital wallet information of the digital wallet of the second user (e.g., a name of the transaction processing system 214 associated with the digital wallet, a currency associated with the digital wallet, etc.).

Based on the response provided by the discovery module 206, the wallet application may present, on the user interface 720B, the information of the second user and the digital wallet information of the digital wallet of the second user (e.g., the name of the second user, the name of the transaction processing system 214 (PayPal), etc.), as shown in stages 706B and 708B of the user interface flow 700A. The wallet application may also provide, on the user interface 720B, a text input field 728B that allows the first user to enter a transaction amount associated with the transaction.

At stage 710B, the wallet application prompts the first user to confirm request funds in the specified amount from the second user. After the first user confirms the transaction, the wallet application may initiate the transaction using the universal transaction platform 132. For example, the wallet application may initiate the funds transfer transaction by transmitting a transaction request (e.g., a pull API call, etc.) to the universal transaction platform 132 to request funds to be transferred from the digital wallet of the second user registered with the transaction processing system 212 to the digital wallet of the first user registered with the transaction processing system 214. The transaction request may include the identity of the sender (e.g., the second user), funding account information of the sender, the identity of the recipient (e.g., the first user), funding account information of the recipient, the transfer amount, etc. Using the information included in the transaction request, the universal transaction platform 132 may process the funds transfer transaction using the techniques disclosed herein. The universal transaction platform 132 may transmit an indication of the transaction being completed back to the wallet application. The wallet application 116 may then indicate to the user that the transaction has been completed via the user interface 720B based on the indication received from the universal transaction platform 132, as shown in stage 712B of the user interface flow 700B.

Figure 8:
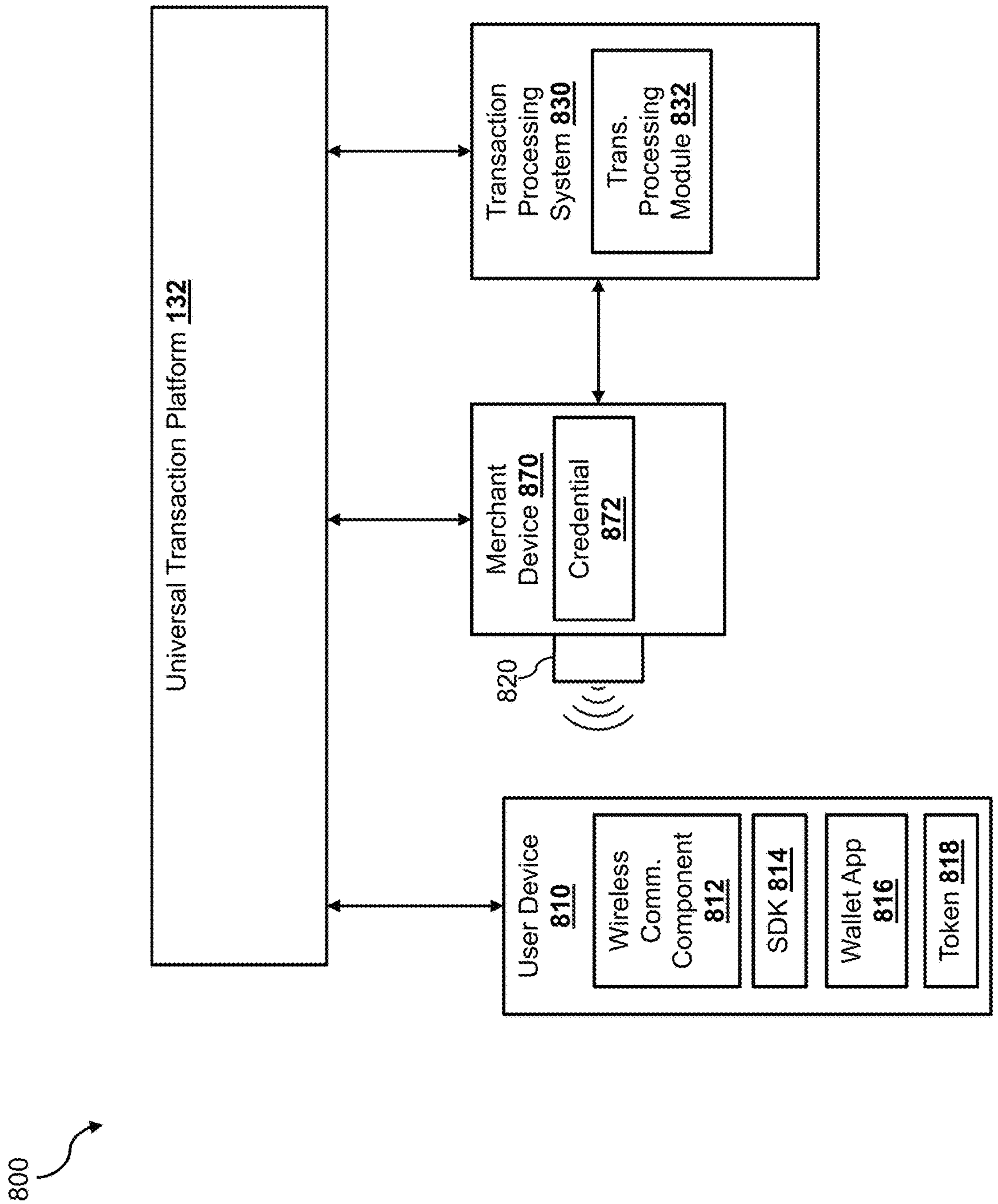
FIG. 8 illustrates components and interactions of different devices for conducting a transaction via a short-range wireless communication according to an embodiment of the present disclosure.

FIG. 8 illustrates components and interactions of different devices in a system 800 for conducting a transaction via a short-range wireless communication (e.g., a NFC communication, Bluetooth® communication, etc.) according to an embodiment of the disclosure. As shown in FIG. 8, a user device 810, a merchant device 870, and a transaction processing system 830 are communicatively coupled with the universal transaction platform 132 for facilitating a transaction conducted between a user of the user device 810 and a merchant of the merchant device 870. The user of the user device 810 may correspond to the user 140, and the user device 810 may correspond to the user device 110 in FIG. 1. Furthermore, the merchant device 870 may correspond to the merchant device 170, and the transaction processing system 830 may correspond to the transaction processing system 192 in FIG. 1 (or the transaction processing system 212 in FIG. 2).

The user device 810 may be operated by a user, which may be a mobile device, smart glasses, a smart watch, or any other devices used by the user. The user device 810 includes a wireless communication component 812, an SDK 814, a wallet application, and a token 818. In some embodiments, the wireless communication component 812 includes an integrated circuit chip that includes an antenna configured to communicate with other devices via a short-range wireless communication protocol. For example, the wireless communication component 812 may include an NFC chip configured to facilitate near-field communication with other NFC-supported devices. In another example, the wireless communication component 812 may include a Bluetooth® chip configured to facilitate Bluetooth® communication with other Bluetooth-supported devices.

The wallet application 816 may correspond to the wallet application 116 of the user device 110, and may be linked to a digital wallet of the user of the user device 810. Through the wallet application 816, the user may access data and functionalities associated with the digital wallet. For example, via the wallet application 816, the user may initiate a transaction with other users (e.g., the merchant of the merchant device 870, etc.).

The SDK 814 may include a computer application that is provided by the universal transaction platform 132. In some embodiments, the SDK 814 may be integrated within the wallet application 816, and may enable the wallet application 816 to access enhanced transaction functionalities provided by the universal transaction platform 132. For example, through the SDK 814, the user may use the user device 810 to initiate a transaction with another device via a short-range wireless communication (e.g., an NFC communication, a Bluetooth® communication, etc.), even though the digital wallet of the user of the user device 810 and a digital wallet of a user of the other device are incompatible (e.g., registered with different transaction processing systems, etc.).

In some embodiments, the user of the user device 810 may, via the SDK 814, register with the universal transaction platform 132 such that the SDK 814 may provide the enhanced transaction functionalities to the user. For example, the SDK 814 may transmit a registration request to the universal transaction platform 132. Since the SDK 814 is connected with or integrated within the wallet application 816, the SDK 814 may access digital wallet information associated with the digital wallet of the user. The digital wallet information may include data that identifies the transaction processing system with which the digital wallet is registered and an identifier associated with the digital wallet (e.g., an account number, a currency used in the digital wallet, etc.). The SDK 814 may transmit the digital wallet information to the universal transaction platform 132 as part of the registration process. In some embodiments, the SDK 814 also transmits additional information to the universal transaction platform 132, such as device information associated with the user device (e.g., a device identifier of the user device 810, a computer hardware and/or software configuration of the user device 810, etc.) and user information associated with the user (e.g., a name of the user, a geographical location associated with the user, etc.).

The universal transaction platform 132 may register the user of the user device 810 based on the digital wallet information, the device information, and user information. For example, the universal transaction platform 132 may generate a private key/public key pair for facilitating secured communications between the universal transaction platform 132 and the user device 810. The universal transaction platform 132 may also issue credentials for the user for facilitating transactions conducted using the user device 810 of the user. When the user of the user device 810 initiates a transaction with another user (e.g., the merchant associated with the merchant device 870, etc.), the SDK 814 may first transmit a token request to the universal transaction platform 132. The token request may include transaction data of the transaction, such as a transaction amount, identities of the parties involved in the transaction (e.g., the user of the user device 810, the merchant associated with the merchant device 870, etc.), a description of the one or more items that the user is purchasing from the merchant, etc.

The universal transaction platform 132 may generate the token 818 for the token request based on the transaction data. For example, the token 818 may be generated to include the transaction data or information that indicates the transaction data (e.g., by hashing the transaction data using one or more hash algorithms, etc.), and transmit the token 818 back to the SDK 814 as a response to the token request, which may be used to facilitate the processing of the transaction. The token may be generated in a format that can be recognized by different transaction processing systems, such that any transaction processing system that receives the token can identify the universal transaction platform as the origin of the token 818. In some embodiments, the token 818 is generated The SDK 814 may store the token 818 on the user device 810 until the user device establishes a short-range wireless communication with another device (e.g., the merchant device 870, etc.) for processing the transaction. In some embodiments, the SDK 814 may transmit one or more token requests to the universal transaction platform 132 before initiating a transaction (e.g., prior to the user entering into the physical store of the merchant, etc.), and may store one or more tokens on the user device 810 for use in future transactions. This way, the user may still use the user device 810 to conduct transactions with other devices when the user device 810 cannot connect to the universal transaction platform 132 (e.g., when the user device 810 has limited connectivity to the Internet, etc.).

The merchant device 870 is associated with a wireless communication component 820 for facilitating short-range wireless communications between the merchant device 870 and other devices, such as the user device 810. The wireless communication component 820 may be integrated within the merchant device 870 or may be an external device that is communicatively coupled with the merchant device 870. In some embodiments, the wireless communication component 820 includes an integrated circuit chip that includes an antenna configured to communicate with other devices via a short-range wireless communication protocol. For example, the wireless communication component 820 may include an NFC chip configured to facilitate near-field communication with other NFC-supported devices. In another example, the wireless communication component 820 may include a Bluetooth® chip configured to facilitate Bluetooth® communication with other Bluetooth-supported devices. In another example, the wireless communication component 820 may include other wireless communication chips, such as a wi-fi chip, etc. In some embodiments, the wireless communication component 820 may include computer programming code that, when executed by the merchant device 870, emulates an integrated circuit chip (e.g., an NFC chip, a Bluetooth® chip, etc.) that enables the merchant device 870 to communicate with other devices using near-field communication without having a physical NFC chip. Details on emulating the NFC component can be found in U.S. patent application Ser. No. 19/049,401 titled "Proximity Tokenized Data Transmission for Interoperable Device Platforms," filed Feb. 10, 2025, which is incorporated herein by reference in its entirety.

The merchant of the merchant device 870 may have a digital wallet that is registered with a transaction processing system (e.g., the transaction processing system 830, etc.). The transaction processing system 830 includes a transaction processing module 832 for processing transactions conducted between the merchant and other users (e.g., consumers of the merchant, etc.). For example, when the merchant device 870 receives a transaction request submitted by other devices (e.g., the user device 810 via a short-range wireless communication between the merchant device 870 and the user device 810, etc.), the merchant device 870 may forward the transaction request to the transaction processing system 830, and the transaction processing module 832 may process the transaction for the merchant based on the transaction request. However, the transaction processing module 832 may not be able to process a transaction for the merchant when the transaction involves a party (e.g., the user of the user device 810, etc.) in the transaction uses a digital wallet that is not registered with the transaction processing system 830.

As such, the merchant may also register with the universal transaction platform 132, such that the merchant and the merchant device 870 may access the enhanced transaction functionalities provided by the universal transaction platform 132 as disclosed herein. In some embodiments, the merchant device 870 transmits a registration request to the universal transaction platform 132. The registration request may include device information associated with the merchant device 870 (e.g., a device identifier associated with the merchant device 870, a hardware and/or software configuration associated with the merchant device 870, etc.), merchant information associated with the merchant (e.g., a name of the merchant, a geographical location corresponding to the merchant, etc.), and digital wallet information associated with the digital wallet of the merchant. The digital wallet information may include data that identifies the transaction processing system (e.g., the transaction processing system 830, etc.) with which the digital wallet is registered and an identifier associated with the digital wallet (e.g., an account number, a currency used in the digital wallet, etc.).

The universal transaction platform 132 may register the merchant based on the digital wallet information, the device information, and merchant information. For example, the universal transaction platform 132 may generate a private key/public key pair for facilitating secured communications between the universal transaction platform 132 and the merchant device 870. The universal transaction platform 132 may also issue a credential 872 for the merchant device 870 for facilitating transactions conducted using the merchant device 870. Once the user of the user device 810 and the merchant of the merchant device 870 are onboarded (e.g., registered, etc.) with the universal transaction platform 132, the user of the user device 810 and the merchant of the merchant device 870 may conduct transactions via a wireless communication (e.g., a NFC communication, Bluetooth® communication, wi-fi communication, etc.) using the universal transaction platform 132, even when the digital wallets used by the user and the merchant are incompatible (e.g., registered with different transaction processing systems, etc.).

Figure 9:
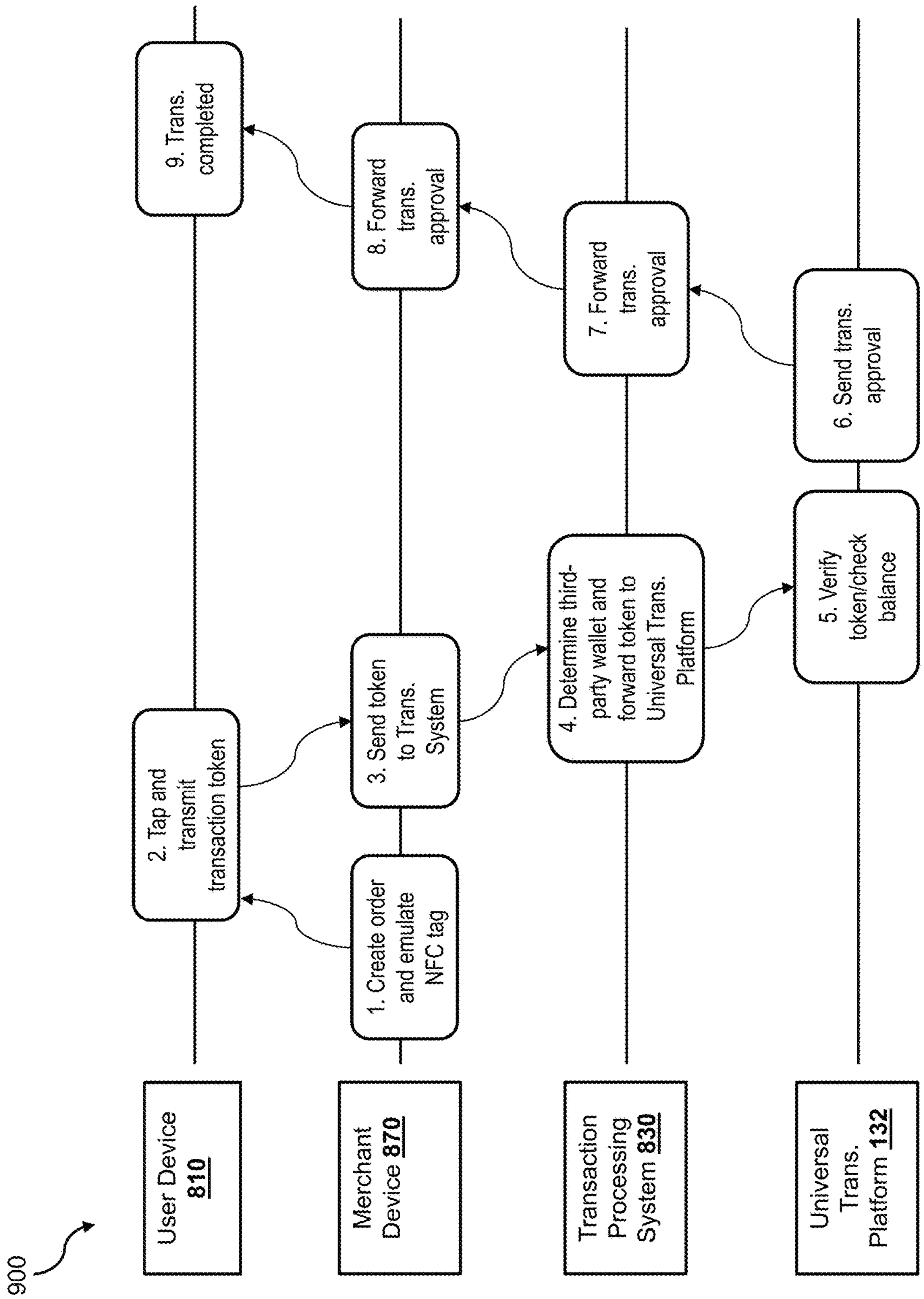
FIG. 9 is a swim lane diagram illustrating an example data flow for processing a transaction via a short-range wireless communication according to an embodiment of the present disclosure.

FIG. 9 is a swim lane diagram that illustrates an example data flow 900 among different devices for processing a transaction via a short-range wireless communication according to an embodiment of the disclosure. In the example illustrated in the data flow 900, the user of the user device 810 is purchasing one or more items from the merchant of the merchant device 870 at a physical store of the merchant. For example, the user of the user device 810 may have selected the one or more items for purchase from the merchant. The user device 810 may obtain transaction data associated with the purchase transaction between the user and the merchant. For example, the user may use the user device 810 to scan codes associated with the one or more items. In another example, the user device 810 may also receive the transaction data associated with the transaction from the merchant device 870 via a short-range wireless communication.

Based on the transaction data, the SDK 814 may transmit a token request for the transaction to the universal transaction platform 132. The token request may include information that identifies the user of the user device 810 (e.g., an identifier of the user, etc.) and the transaction data associated with the transaction (e.g., an identity of the merchant involved in the transaction, a transaction amount, a currency used by the merchant, etc.). The universal transaction platform 132 may generate the token 818 for the transaction request, and transmit the token 818 to the SDK 814, which in turn stores the token 818 on the user device 810. In some embodiments, prior to transmitting the token 818, the universal transaction platform 132 may verify that the digital wallet of the user has sufficient funds for the transaction. In some embodiments, the universal transaction platform 132 transmits an instruction to the transaction processing system associated with the digital wallet of the user to hold funds associated with the transaction from the digital wallet of the user, such that the funds is locked and cannot be used for other transactions for a duration of time (e.g., until an expiration time). The universal transaction platform 132 may also determine an expiration time for the token 818 (e.g., by calculating the expiration time using the current time when the token 818 is generated and the duration of time when the funds is locked, etc.), and associate the expiration time to the token 818 (e.g., by incorporating the expiration time information into the token 818, etc.).

In step 1 of the data flow 900, the merchant device 870 creates an order for the transaction and activates the wireless communication component 820 of the merchant device 870. In some embodiments where the wireless communication component 820 is partially implemented using a computer program, the merchant device 870 may instruct the computer program to begin emulating a tag (e.g., an NFC tag, etc.). The order may be linked to a digital wallet provider (e.g., a digital wallet registered with a third-party transaction system, etc.). In some embodiments, the universal transaction platform 830 (upon receiving the order) may resolve the merchant identity to determine where to send the payment after funds are verified with the originating wallet.

In step 2 of the data flow 900, the user may place the user device 810 in proximity (e.g., within a threshold distance, etc.) with the wireless communication component 820 of the merchant device 870. The wireless communication component 812 may detect the wireless communication component 820 of the merchant device 870 (e.g., detecting the NFC tag, etc.), and may establish a short-range wireless communication session with the merchant device 870. The SDK 814 of the user device 810 may transmit the token 818 stored on the user device 810 to the merchant device 870 via the short-range wireless communication session. In some embodiments, instead of transmitting the token 818, the SDK 814 may encrypt credentials issued to the user of the user device 810 (which may include the digital wallet information of the digital wallet of the users) using the token, and may transmit the encrypted credentials of the user (instead of the token 818) to the merchant device 870.

In step 3 of the data flow 900, the merchant device 870 transmits the token 818 (and/or the encrypted credentials of the user) and the transaction data associated with the transaction to the transaction processing system 830. Based on the token 818 and/or the encrypted credentials of the user, the transaction processing module 832 may determine that the transaction is conducted using a digital wallet that is incompatible with the transaction processing system 830 (e.g., not registered with the transaction processing system 830, etc.) in step 4 of the data flow 900. As such, instead of processing the transaction internally, the transaction processing module 832 transmits merchant data (e.g., digital wallet information associated with the digital wallet of the merchant, etc.), the transaction data, the token 818, and/or the encrypted credentials to the universal transaction platform 132.

In step 5 of the data flow 900, the universal transaction platform 132 verifies the transaction based on the token 818 and/or the encrypted credentials. For example, if the universal transaction platform 132 receives the token 818 from the transaction processing system 830, the universal transaction platform 132 may extract the expiration time information from the token 818, and verify that the token 818 has not expired based on the expiration time information. If the universal transaction platform 132 receives the encrypted credentials, the universal transaction platform 132 may re-generate a token based on the transaction data received from the transaction processing system 830. The universal transaction platform 132 may then attempt to decrypt the encrypted credentials using the re-generated token. The transaction is verified if the encrypted credentials are successfully decrypted using the re-generated token. Based on the decrypted credentials, the universal transaction platform 132 may determine the digital wallet of the user for use in the transaction. The universal transaction platform 132 may process the transaction using techniques disclosed herein. For example, the universal transaction platform 132 may process the transaction by communicating with one or more of the transaction processing system 830 and the transaction processing system associated with the digital wallet of the user.

After completing the transaction, the universal transaction platform 132 transmits a transaction approval signal to the transaction processing system 830 in step 6 of the data flow 900. In step 7 of the data flow 900, the transaction processing system 830 forwards the transaction approval signal to the merchant device 870, which in turn forwards the transaction approval signal to the user device 810 in step 8 of the data flow 900. The SDK 814 of the user device 810 may then present a transaction complete notification on the user device 810. Since both the merchant device 870 and the user device 810 receive the indication that the transaction is completed, the merchant may release the one or more items to the user.

Figure 10:
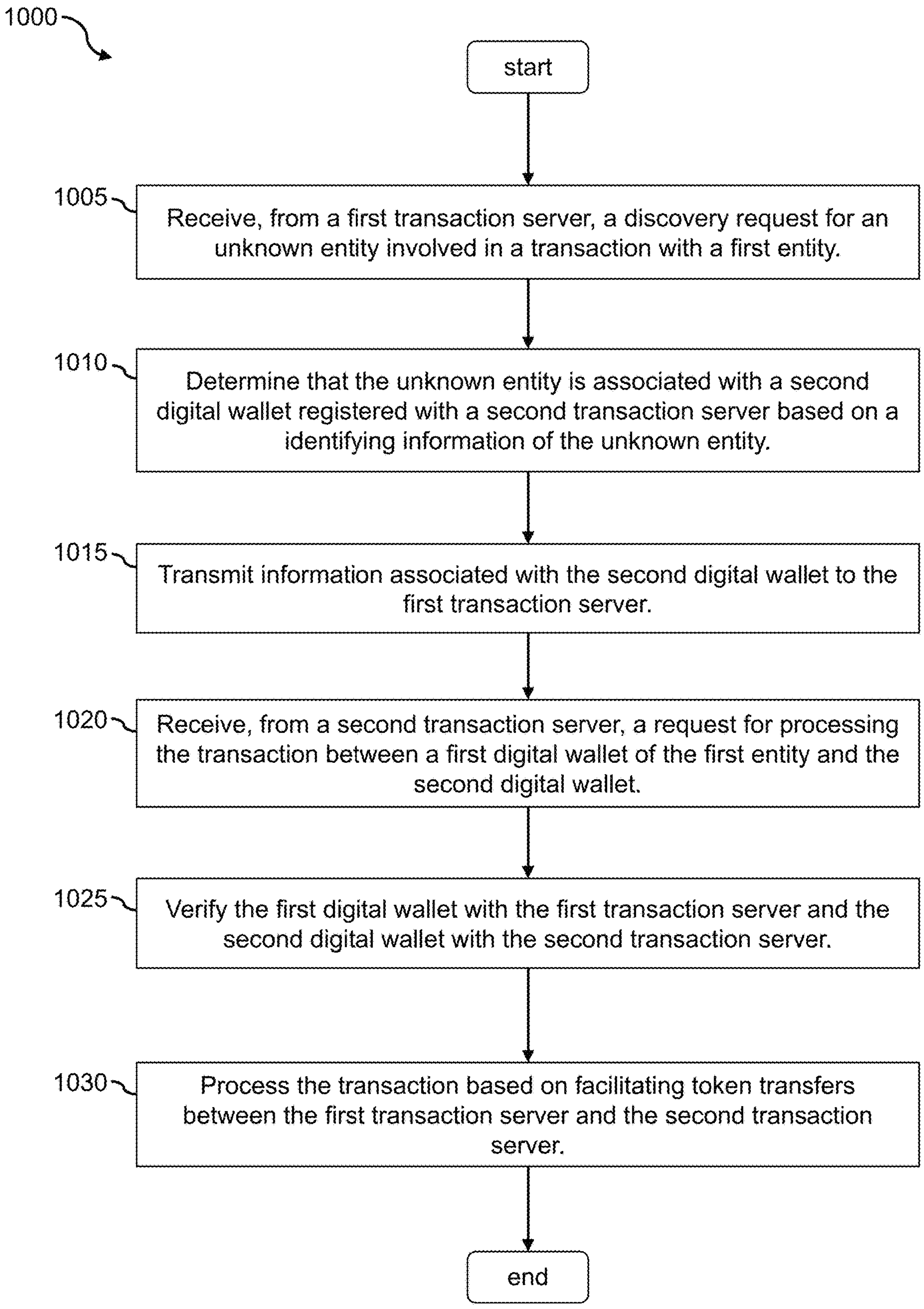
FIG. 10 is a flowchart showing a process of processing a transaction between incompatible digital wallets according to an embodiment of the present disclosure.

FIG. 10 illustrates a process 1000 for processing a transaction between incompatible digital wallets according to various embodiments of the disclosure. In some embodiments, at least a portion of the process 1000 may be performed by the universal transaction platform 132. The process 1000 begins by receiving (at step 1005), from a first transaction server, a discovery request for an unknown entity involved in a transaction with a first entity. For example, the first entity may correspond to a merchant (e.g., the merchant associated with the merchant server 120, etc.) that provides a user interface, which enables a second entity (e.g., the user 140 of the user device 110, etc.) to browse information associated with the merchant (e.g., product information associated with items being offered by the merchant, etc.). The first entity may receive identifying information associated with the second entity during the checkout process. In another example, the first entity may be a user (e.g., the user 140 of the user device 110) that uses an application (e.g., the wallet application 116, etc.) to submit a funds transfer request for transferring funds to, or receiving funds from, a second entity. In either examples, since the first entity is associated with the first transaction server (e.g., the first entity has a first digital wallet that is registered with the first transaction server, etc.), the first transaction server (e.g., the transaction processing system 192, etc.) may receive a transaction request from the first entity (e.g., via the user interface of the merchant, via the wallet application 116, etc.). The transaction request may include identifying information that identifies the second entity provided by the first entity. When the first transaction server fails to identify a digital wallet that is registered with the first transaction server based on the identifying information, the first transaction server may transmit a discovery request to the universal transaction platform 132. The discovery request may include the identifying information associated with the second entity and provided by the first entity.

In step 1010, the universal transaction platform 132 determines that the unknown entity is associated with a second digital wallet registered with a second transaction server based on identifying information of the second entity. For example, the discovery module 206 of the universal transaction platform 132 may queries one or more of the discovery infrastructures (e.g., discovery infrastructures 310, 320, 330, etc.) for digital wallet records based on the identifying information. The discovery module 206 may determine that a digital wallet record corresponds to the identifying information based on the querying. The digital wallet record may represent the second digital wallet associated with the second entity. Based on the information included in the digital wallet record, the discovery module 206 may determine that the second digital wallet is registered with a second transaction server (e.g., the transaction processing system 194, etc.).

The universal transaction platform 132 then transmits (in step 1015) information associated with the second digital wallet to the first transaction server. For example, the discovery module 206 may generate a data object for the second digital wallet, and may insert digital wallet information of the second digital wallet from the digital wallet record into the data object. The discovery module 206 may transmit the data object to the first transaction server as a response to the discovery request.

In step 1020, the universal transaction platform 132 receives, from a second transaction server, a request for processing the transaction between the first digital wallet and the second digital wallet. For example, the universal transaction platform 132 may receive a transaction request from the transaction processing system 194 associated with the second digital wallet. The transaction request may identify the first digital wallet registered with the transaction processing system 192, the second digital wallet registered with the transaction processing system 194, a transaction amount and other information pertaining to the transaction.

The universal transaction platform 132 then verifies (at step 1025) the first digital wallet with the first transaction server and the second digital wallet with the second transaction server and processes (at step 1030) the transaction based on facilitating token transfers between the first transaction server and the second transaction server. For example, after receiving the transaction request, the universal transaction platform 132 may execute one or more computer programs associated with the different transaction processing systems 192 and 194 to authenticate the first entity and the second entity, and to verify the first digital wallets and the second digital wallets, respectively. The universal transaction platform 132 may also communicate with the transaction processing systems 192 and 194 to process the transaction (e.g., exchange funds between the transaction processing systems 192 and 194, etc.).

Figure 11:
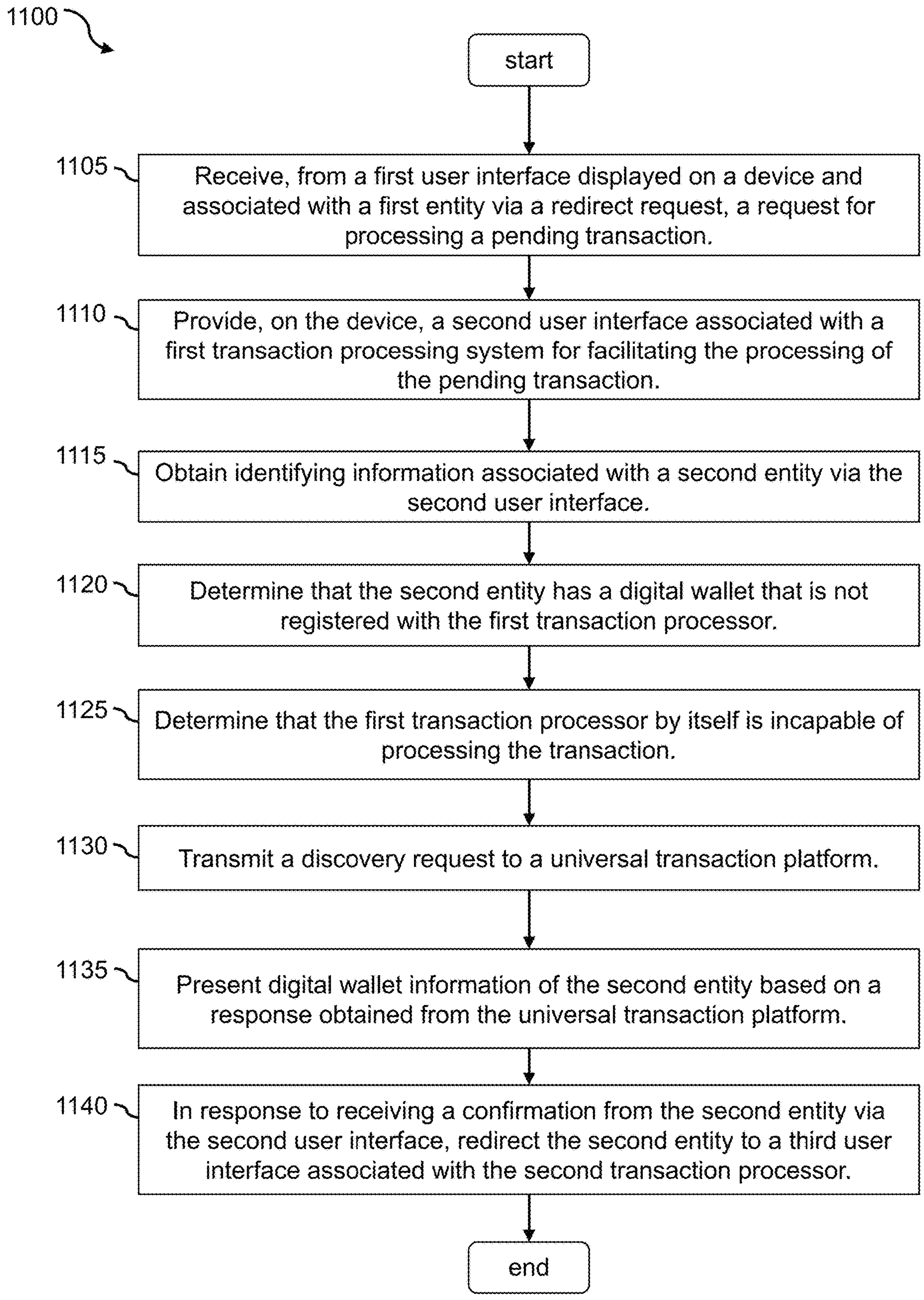
FIG. 11 is a flowchart showing a process of providing user interface transitions on a user device to facilitate a transaction between incompatible digital wallets according to an embodiment of the present disclosure.

FIG. 11 illustrates a process 1100 for providing user interface transitions on a user device to facilitate a transaction between incompatible digital wallets according to various embodiments of the disclosure. In some embodiments, at least a portion of the process 1100 may be performed by a transaction processing system. The process 1100 begins by receiving (at step 1105), from a first user interface displayed on a device and associated with a first entity via a redirect request, a request for processing a pending transaction. The first entity may be a merchant that provides the first user interface (e.g., a merchant website, a mobile application interface, etc., that is hosted by the merchant server 120) for interacting with its users. The merchant may have a digital wallet that is registered with the first transaction processing system (e.g., the transaction processing system 192, etc.). As such, the merchant may use the transaction processing system 192 to process any transactions conducted with the merchant via the user interface. A user (e.g., the user 140) may use a use device (e.g., the user device 110) to browse the first user interface provided by the merchant. As the merchant server 120 receives a checkout request from the user 140 via the first user interface (e.g., the user 140 initiating a checkout request via the merchant website, etc.), the merchant server 120 may transmit a redirect request to the first transaction processing system. The redirect request may include transaction data associated with the transaction and an identifier associated with the digital wallet of the merchant that is registered with the first transaction processing system.

Upon receiving the redirect request, the first transaction processing system may provide (at step 1110), on the device, a second user interface associated with the first transaction processing system for facilitating the processing of the pending transaction. For example, the first transaction processing system may provide the second user interface (e.g., a webpage) on the device that enables the user access to a digital wallet of the user. If the user has a digital wallet that is registered with the first transaction processing system, the user may log on to an account with the first transaction processing system to access data and functionalities associated with the digital wall via the second user interface. In some embodiments, the first transaction processing system obtains (at step 1115) identifying information associated with the second entity via the second user interface. For example, via the second user interface, the first transaction processing system may prompt the second entity to provide the identifying information (e.g., a phone number, an email address, etc.) that can be used to identify the second entity.

Based on the identifying information, the first transaction processing system may attempt to identify, for the second entity, a digital wallet that is registered with the first transaction processing system. However, when the first transaction processing system fails to identify any digital wallet based on the identifying information (e.g., no digital wallet was registered with the first transaction processing system using the identifying information, etc.), the first transaction processing system may determine (at step 1120) that the second entity has a digital wallet that is not registered with the first transaction processing system. Since the pending transaction involves digital wallets that are registered with different transaction processing systems which are not compatible with each other, the first transaction processing system may determine (at step 1125) that the first transaction processing system by itself is incapable of processing the transaction.

As such, the first transaction processing system may transmit (at step 1130) a discovery request to a universal transaction platform. For example, the first transaction processing system may transmit a discovery API call to the discovery module 206 of the universal transaction platform 132. The discovery request may include the identifying information received from the merchant server 120. The discovery module 206 may use the identifying information to query one or more discovery infrastructures for a record representing a digital wallet. Based on the record, the discovery module 206 may identify a digital wallet of the second entity, and a second transaction processing system (e.g., the transaction processing system 194) with which the digital wallet is registered. The discovery module 206 may transmit data that identifies the digital wallet of the second entity and the second transaction processing system back to the first transaction processing system as a response to the discovery request. The first transaction processing system may present (at step 1135) digital wallet information of the second entity based on the response obtained from the universal transaction platform 132. For example, via the second user interface provided on the device, the first transaction processing system may present a name of the second entity and a name of the second transaction processing system that is associated with the second entity. The first transaction processing system may also prompt, via the second user interface provided on the device, the second entity for a confirmation to process the pending transaction.

In response to receiving a confirmation from the second entity via the second user interface, the first transaction processing system may redirect (at step 1140) the second entity from the second user interface of the first transaction processing system to a third user interface of the second transaction processing system, wherein the second transaction processing system may authenticate the second entity to access the digital wallet of the second entity for processing the transaction.

Figure 12:
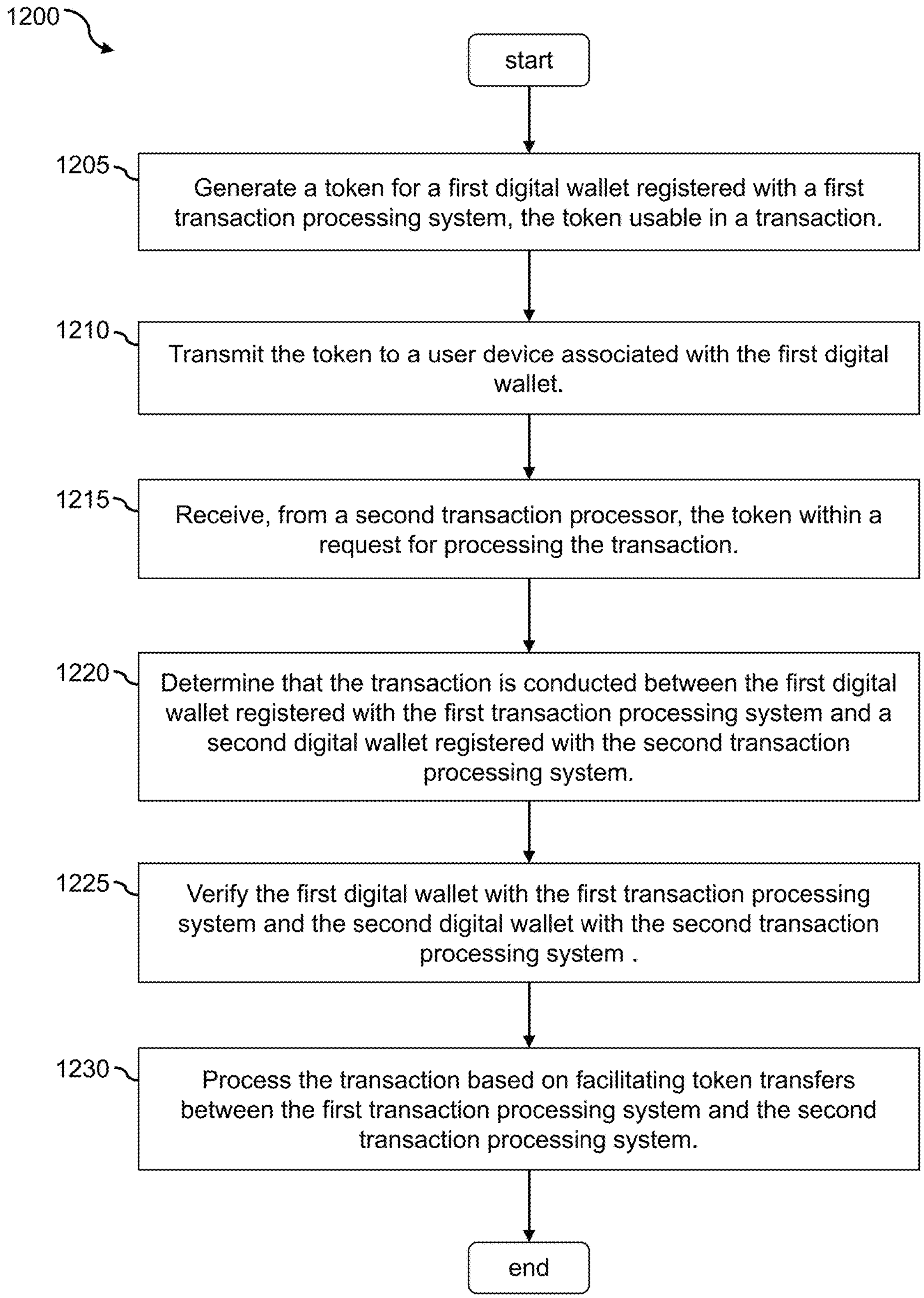
FIG. 12 is a flowchart showing a process of processing a transaction initiated via a short-range wireless communication between two devices according to an embodiment of the present disclosure.

FIG. 12 illustrates a process 1200 for processing a transaction initiated via a short-range wireless communication between two devices according to various embodiments of the disclosure. In some embodiments, at least a portion of the process 1200 may be performed by the universal transaction platform 132. The process 1200 begins by generating (at step 1205) a token for a first digital wallet registered with a first transaction processing system, where the token is usable in a transaction. For example, a user (e.g., the user 140 of the user device 110, etc.) may be at a merchant location of a merchant (e.g., the merchant associated with the merchant server 120, etc.). The user 140 may have selected one or more items for purchase from the merchant. The user device 110 may obtain transaction data associated with the purchase transaction, and may transmit a token request to the universal transaction platform 132. The token request may include the transaction data associated with the purchase transaction. The universal transaction platform 132 may then generate a token (e.g., the token 818) based on the transaction data using the techniques disclosed herein. After generating the token, the universal transaction platform 132 may transmit (at step 1210) the token to the user device 110 as a response to the token request.

As the user 140 is ready to checkout, the user 140 may place the user device 110 in proximity with (e.g., within a threshold distance from, etc.) a merchant device of the merchant (e.g., the merchant device 170, etc.). When the user device 110 detects a presence of the merchant device 170 within the threshold distance, the user device 110 may establish a short-range wireless communication (e.g., a NFC connection, etc.) with the merchant device 170, and may transmit the token (and/or credentials of the user and transaction data that is encrypted using the token, etc.) to the merchant device 170.

Since the merchant may use a second transaction processing system for processing transactions conducted with the merchant, the merchant device 170 may transmit the token to the second transaction processing system. Based on the token, the second transaction processing system may determine that the first digital wallet of the user is incompatible with the second transaction processing system (e.g., the first digital wallet of the user is registered with a different transaction processing system, etc.). The second transaction processing system may determine that it lacks resources (e.g., information associated with the digital wallet of the user, etc.) to process the purchase transaction on its own. As such, the second transaction processing system may transmit a transaction request to the universal transaction platform 132. The transaction request may include the token as well as other information, such as the transaction data associated with the purchase transaction and digital wallet information associated with a second digital wallet of the merchant.

Thus, the universal transaction platform 132 may receive (at step 1215), from the second transaction processing system, the token within a request for processing the transaction. Based on the information included in the transaction request, the universal transaction platform 132 may determine (at step 1220) that the transaction conducted between the first digital wallet registered with the first transaction processing system and the second digital wallet registered with the second transaction processing system.

The universal transaction platform 132 may then verify (at step 1225) the first digital wallet with the first transaction processing system and the second digital wallet with the second transaction processing system and process (at step 1230) the transaction based on facilitating funds transfers between digital wallets identified by the tokens (e.g., between the first transaction processing system and the second transaction processing system, etc.).

Figure 13:
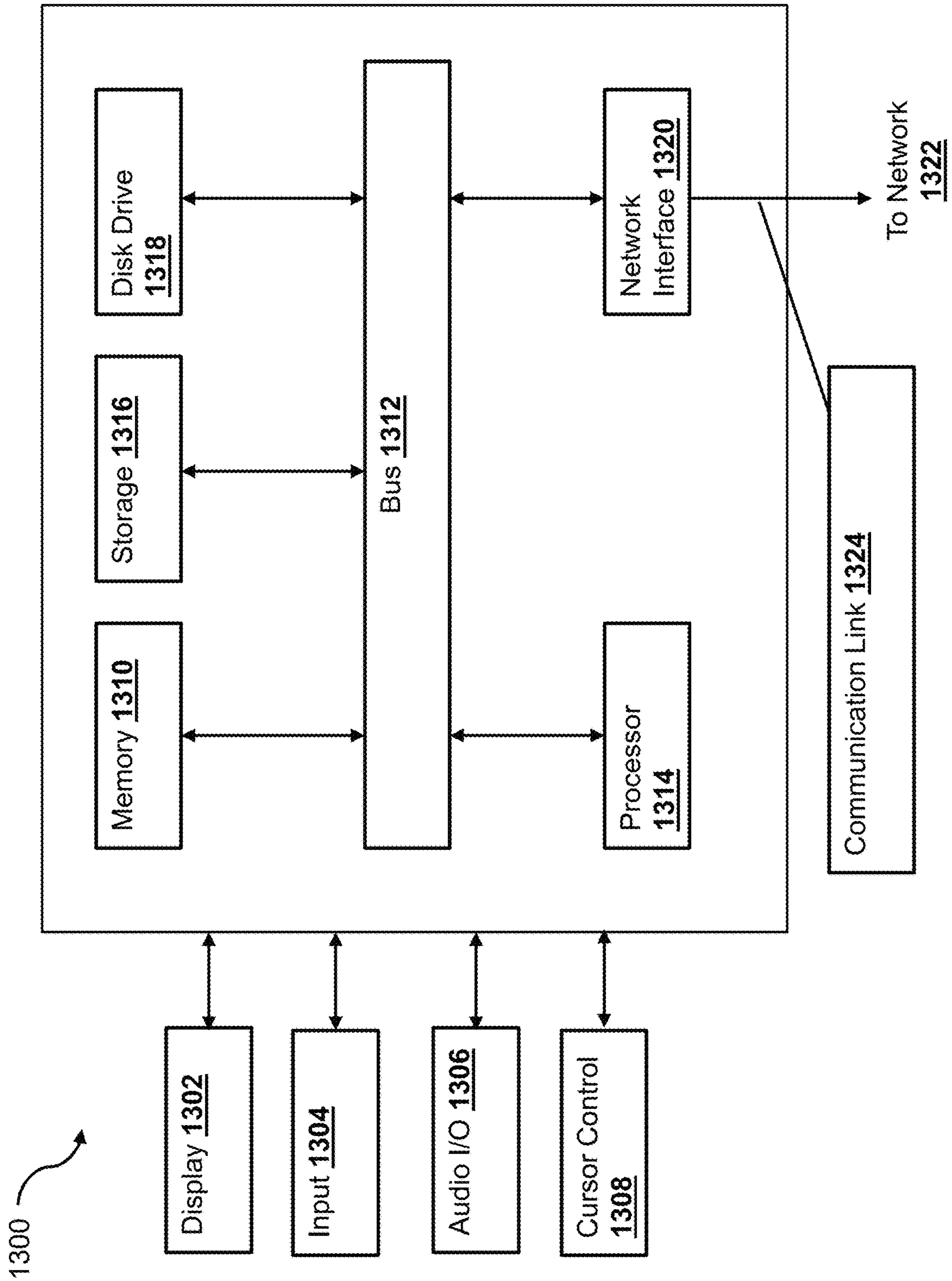
FIG. 13 is a block diagram of a system for implementing a device according to an embodiment of the present disclosure.

FIG. 13 is a block diagram of a computer system 1300 suitable for implementing one or more embodiments of the present disclosure, including the service provider server 130, the merchant server 120, the merchant devices 170 and 870, the user devices 110, 180, and 810, the transaction processing systems 192, 194, 212, 214, 216, 350, and 830, and the servers 252, 254, 256, 258, 352, 354, and 356. In various implementations, the user devices 110, 180, and 810 may include a mobile cellular phone, personal computer (PC), laptop, wearable computing device, etc. adapted for wireless communication, and each of the service provider server 130, the merchant server 120, the merchant devices 170 and 870, the transaction processing systems 192, 194, 212, 214, 216, 350, and 830, and the servers 252, 254, 256, 258, 352, 354, and 356 may include a network computing device, such as a server. Thus, it should be appreciated that the devices 110, 120, 130, 170, 870, 180, 810, 192, 194, 212, 214, 216, 350, 830, 252, 254, 256, 258, 352, 354, and 356 may be implemented as the computer system 1300 in a manner as follows.

The computer system 1300 includes a bus 1312 or other communication mechanism for communicating information data, signals, and information between various components of the computer system 1300. The components include an input/output (I/O) component 1304 that processes a user (i.e., sender, recipient, service provider) action, such as selecting keys from a keypad/keyboard, selecting one or more buttons or links, etc., and sends a corresponding signal to the bus 1312. The I/O component 1304 may also include an output component, such as a display 1302 and a cursor control 1308 (such as a keyboard, keypad, mouse, etc.). The display 1302 may be configured to present a login page for logging into a user account or a checkout page for purchasing an item from a merchant. An optional audio input/output component 1306 may also be included to allow a user to use voice for inputting information by converting audio signals. The audio I/O component 1306 may allow the user to hear audio. A transceiver or network interface 1320 transmits and receives signals between the computer system 1300 and other devices, such as another user device, a merchant server, or a service provider server via a network 1322. In one embodiment, the transmission is wireless, although other transmission mediums and methods may also be suitable. A processor 1314, which can be a micro-controller, digital signal processor (DSP), or other processing component, processes these various signals, such as for display on the computer system 1300 or transmission to other devices via a communication link 1324. The processor 1314 may also control transmission of information, such as cookies or IP addresses, to other devices.

The components of the computer system 1300 also include a system memory component 1310 (e.g., RAM), a static storage component 1316 (e.g., ROM), and/or a disk drive 1318 (e.g., a solid-state drive, a hard drive). The computer system 1300 performs specific operations by the processor 1314 and other components by executing one or more sequences of instructions contained in the system memory component 1310. For example, the processor 1314 can perform the transaction processing functionalities described herein, for example, according to the processes 1000, 1100, and 1200.

Logic may be encoded in a computer readable medium, which may refer to any medium that participates in providing instructions to the processor 1314 for execution. Such a medium may take many forms, including but not limited to, non-volatile media, volatile media, and transmission media. In various implementations, non-volatile media includes optical or magnetic disks, volatile media includes dynamic memory, such as the system memory component 1310, and transmission media includes coaxial cables, copper wire, and fiber optics, including wires that comprise the bus 1312.

In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1300. In various other embodiments of the present disclosure, a plurality of computer systems 1300 coupled by the communication link 1324 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:

a non-transitory memory; and one or more hardware processors coupled with the non-transitory memory and configured to execute instructions from the non-transitory memory to cause the system to:

receive a transaction request from a first transaction processor for processing a transaction between a first entity and a second entity, the transaction request initiated via a first user interface associated with the first entity and presented on a device of the second entity, wherein the first entity has a first digital wallet registered with the first transaction processor configured to process transactions conducted between first digital wallets registered with the first transaction processor;

provide an interface associated with the system on the device based on the transaction request;

obtain, via the interface provided on the device, an identifier associated with a user of the device;

determine that the identifier is associated with a second digital wallet registered with a second transaction processor different from the first transaction processor, wherein the second transaction processor is configured to process transactions conducted between second digital wallets registered with the second transaction processor;

determine that the first transaction processor lacks data needed to process the transaction between the first digital wallet registered with the first transaction processor and the second digital wallet registered with the second transaction processor; and in response to determining that the first transaction processor lacks the data needed to process the transaction, generate a redirect request that redirects the user from the interface associated with the system to a second user interface associated with the second transaction processor, wherein the redirect request includes (i) the data that enables the second transaction processor to process the transaction through the second digital wallet and (ii) an instruction that enables the second transaction processor to redirect the user from the second user interface back to the first user interface associated with the first entity after the transaction is processed.

2. The system of claim 1, wherein executing the instructions further causes the system to:

transmit a discovery request based on the identifier, wherein determining that the identifier is associated with the second digital wallet registered with the second transaction processor is based on a response associated with the discovery request.

3. The system of claim 1, wherein the redirect request further includes transaction data associated with the transaction.

4. The system of claim 1, wherein the redirect request further includes wallet information associated with the first digital wallet, and wherein the redirect request further enables the second transaction processor to submit a transaction processing request to a transaction platform for processing the transaction between the first digital wallet with the first transaction processor and the second digital wallet with the second transaction processor.

5. The system of claim 1, wherein executing the instructions further causes the system to:

prior to generating the redirect request, transmit a discovery request to a transaction platform different from the first transaction processor based on the identifier;

receive, from the transaction platform based on the discovery request, a data object representing the second digital wallet with the second transaction processor;

present, on the interface, information associated with the second digital wallet based on the data object; and prompt, via the interface, the user to confirm processing the transaction with the first entity using the second digital wallet.

6. The system of claim 5, wherein executing the instructions further causes the system to:

receive, via the interface, a confirmation from the user, wherein generating the redirect request is in response to receiving the confirmation.

7. The system of claim 1, wherein the interface is provided via a browser application of the device, and wherein the redirect request is an HTTP redirect request.

8. A method comprising:

receiving, from a first user interface associated with a first entity and presented on a device, a proposed transaction between the first entity and a second entity associated with the device, wherein the first entity has a first digital wallet that is registered with a first transaction processor configured to process transactions conducted between first digital wallets registered with the first transaction processor;

presenting, on the device, an interface;

obtaining, via the interface, an identifier associated with the second entity;

determining that the identifier is associated with a second digital wallet registered with a second transaction processor different from the first transaction processor, wherein the second transaction processor is configured to process transactions conducted between second digital wallets registered with the second transaction processor;

determining that the first transaction processor lacks resources needed to process the proposed transaction between the first digital wallet registered with the first transaction processor and the second digital wallet registered with the second transaction processor; and in response to determining that the first transaction processor lacks the resources needed to process the proposed transaction, generating a redirect request that redirects the second entity from the interface to a second user interface associated with the second transaction processor for processing the proposed transaction, wherein the redirect request comprises (i) data that enables the second transaction processor to process the proposed transaction through the second digital wallet and (ii) an instruction that enables the second transaction processor to redirect the second entity from the second user interface back to the first user interface associated with the first entity after the proposed transaction is processed.

9. The method of claim 8, further comprising:

transmitting a discovery request to a transaction platform based on the identifier, wherein the determining that the identifier is associated with the second digital wallet registered with the second transaction processor is based on a response associated with the discovery request.

10. The method of claim 8, wherein the redirect request further comprises wallet information associated with the first digital wallet of the first entity that enables the second transaction processor to submit a transaction processing request to a transaction platform for processing the proposed transaction between the first digital wallet registered with the first transaction processor and the second digital wallet registered with the second transaction processor.

11. The method of claim 8, wherein the data further enables the second transaction processor to perform a user authentication process for the second entity via the second user interface.

12. The method of claim 8, further comprising:

prior to the generating the redirect request, transmitting a discovery request to a transaction platform different from a platform of the first transaction processor based on the identifier;

receiving, from the transaction platform, wallet information associated with one or more digital wallets corresponding to the identifier, wherein the wallet information indicates that the second digital wallet from the one or more digital wallets is associated with the second transaction processor;

presenting, on the interface, the wallet information associated with the one or more digital wallets; and prompting, via the interface, the second entity to provide a selection from the one or more digital wallets for use in the proposed transaction.

13. The method of claim 12, further comprising:

receiving, via the interface, the selection from the second entity that identifies the second digital wallet from the one or more digital wallets for use in the proposed transaction, and wherein the generating the redirect request is further based on the selection.

14. The method of claim 8, wherein the interface is presented via a browser application of the device, and wherein the redirect request is an HTTP redirect request.

15. A non-transitory machine-readable medium having stored thereon machine-readable instructions executable to cause a machine to perform operations comprising:

receiving, from a merchant website associated with a merchant and presented on a device, transaction information associated with a pending transaction between the merchant and a user of the device, wherein the merchant has a first digital wallet registered with a first transaction processor configured to process transactions conducted between first digital wallets registered with the first transaction processor;

presenting, on the device, a first user interface based on the transaction information;

receiving, via the first user interface, an identifier associated with the user of the device;

determining, based on communicating with a transaction platform different from a platform of the first transaction processor, that the identifier corresponds to a second digital wallet that is registered with a second transaction processor configured to process transactions between second digital wallets registered with the second transaction processor; and in response to determining that the first transaction processor lacks data needed to process the pending transaction, generating a redirect request for redirecting the user from the first user interface to a second user interface associated with the second transaction processor for processing the pending transaction, wherein the redirect request comprises (i) the data that enables the second transaction processor to process the pending transaction through the second digital wallet and (ii) instructions that enable the second transaction processor to redirect the user from the second user interface to the merchant website after the pending transaction is processed.

16. The non-transitory machine-readable medium of claim 15, wherein the operations further comprise:

transmitting a discovery request to the transaction platform, wherein the discovery request comprises the identifier; and receiving, from the transaction platform, an indication that the identifier corresponds to the second digital wallet that is registered with the second transaction processor, wherein the redirect request is generated based on the indication.

17. The non-transitory machine-readable medium of claim 15, wherein the operations further comprise:

prior to the generating the redirect request, transmitting a discovery request to the transaction platform;

receiving a plurality of data objects representing a plurality of digital wallets associated with the identifier;

presenting, on the first user interface, a plurality of selectable options corresponding to the plurality of digital wallets; and prompting, on the first user interface, the user to select one of the plurality of digital wallets for use in the pending transaction.

18. The non-transitory machine-readable medium of claim 17, wherein the operations further comprise:

receiving, from the user and via the first user interface, a selection of one of the plurality of selectable options, wherein the redirect request is generated based on the selection.

19. The non-transitory machine-readable medium of claim 15, wherein the transaction information is generated by a software development kit associated with the first transaction processor and implemented within the merchant website.

20. The non-transitory machine-readable medium of claim 15, wherein the redirect request further comprises a network address associated with the merchant website.

* * * * *